United States Patent [19]

Fujikawa et al.

[11] Patent Number: 5,351,055
[45] Date of Patent: Sep. 27, 1994

[54] RADAR APPARATUS

[75] Inventors: Takumi Fujikawa, Takarazuka; Motoji Kondo, Kobe, both of Japan

[73] Assignee: Furuno Electric Co., Ltd., Hyogo, Japan

[21] Appl. No.: 67,165

[22] Filed: May 26, 1993

Related U.S. Application Data

[63] Continuation of Ser. No. 721,547, Jul. 18, 1991, abandoned.

[30] Foreign Application Priority Data

Nov. 21, 1989 [JP] Japan .................. 1-304188
Nov. 25, 1989 [JP] Japan .................. 1-305835

[51] Int. Cl.$^5$ .................................. G01S 7/66
[52] U.S. Cl. .................................. 342/184; 342/189; 342/159
[58] Field of Search ............... 342/184, 176, 179, 189, 342/195, 159

[56] References Cited

U.S. PATENT DOCUMENTS

| | | | |
|---|---|---|---|
| 3,797,014 | 3/1974 | Tompkins et al. | 342/90 |
| 3,838,420 | 9/1974 | Heard et al. | 342/185 |
| 4,002,827 | 1/1977 | Nevin et al. | 342/185 |
| 4,034,370 | 7/1977 | Mims | 342/25 |
| 4,053,885 | 10/1977 | Tomita et al. | 342/162 |
| 4,118,703 | 10/1978 | Williams | 342/158 |
| 4,167,007 | 9/1979 | McGeoch et al. | 342/44 |
| 4,224,621 | 9/1980 | Cornett et al. | 342/183 |
| 4,336,539 | 6/1982 | Hendrickson | 342/185 X |
| 4,357,607 | 11/1982 | Van der Heijden et al. | 342/197 |
| 4,383,258 | 5/1983 | Morin | 342/185 |
| 4,439,765 | 3/1984 | Wilmot | 342/58 |
| 4,443,797 | 4/1984 | Cramp et al. | 342/185 |
| 4,489,319 | 12/1984 | Hansen | 342/93 |
| 4,829,308 | 5/1989 | Tol et al. | 342/185 |
| 4,833,475 | 5/1989 | Pease et al. | 342/185 |
| 4,845,501 | 7/1989 | Pease et al. | 342/185 |
| 4,972,194 | 11/1990 | Carrara et al. | 342/163 |
| 5,012,252 | 4/1991 | Faulkner | 342/192 |
| 5,065,151 | 11/1991 | Sandbrand | 358/220 X |
| 5,075,694 | 12/1991 | Donnangelo et al. | 342/455 |
| 5,157,406 | 10/1992 | Fujikawa et al. | 342/185 |

Primary Examiner—John B. Sotomayor

[57] ABSTRACT

A radar apparatus displays echo signals in a manner that desired echo signals can be easily distinguished from unwanted echo signals such as sea clutter and the like and eliminated, when any one of display modes is selected. The radar apparatus includes a receiving unit for receiving echo signals, a buffer memory for storing echo signals resulting from one search signal and produced by the receiving unit, a first memory for storing echo signals coming from a wide range of directions in memory elements corresponding to points on the surface of the search at which the echo signals are generated respectively, signal process device for applying a signal process on the signals outputted from the buffer memory and the signals read out from the first memory and supplying resultant output signals to the first memory, a second memory for storing the output signals of the correlation means in corresponding memory elements thereof determined in compliance with a display mode selected, and an indicator for displaying the signals read out from the second memory.

49 Claims, 11 Drawing Sheets

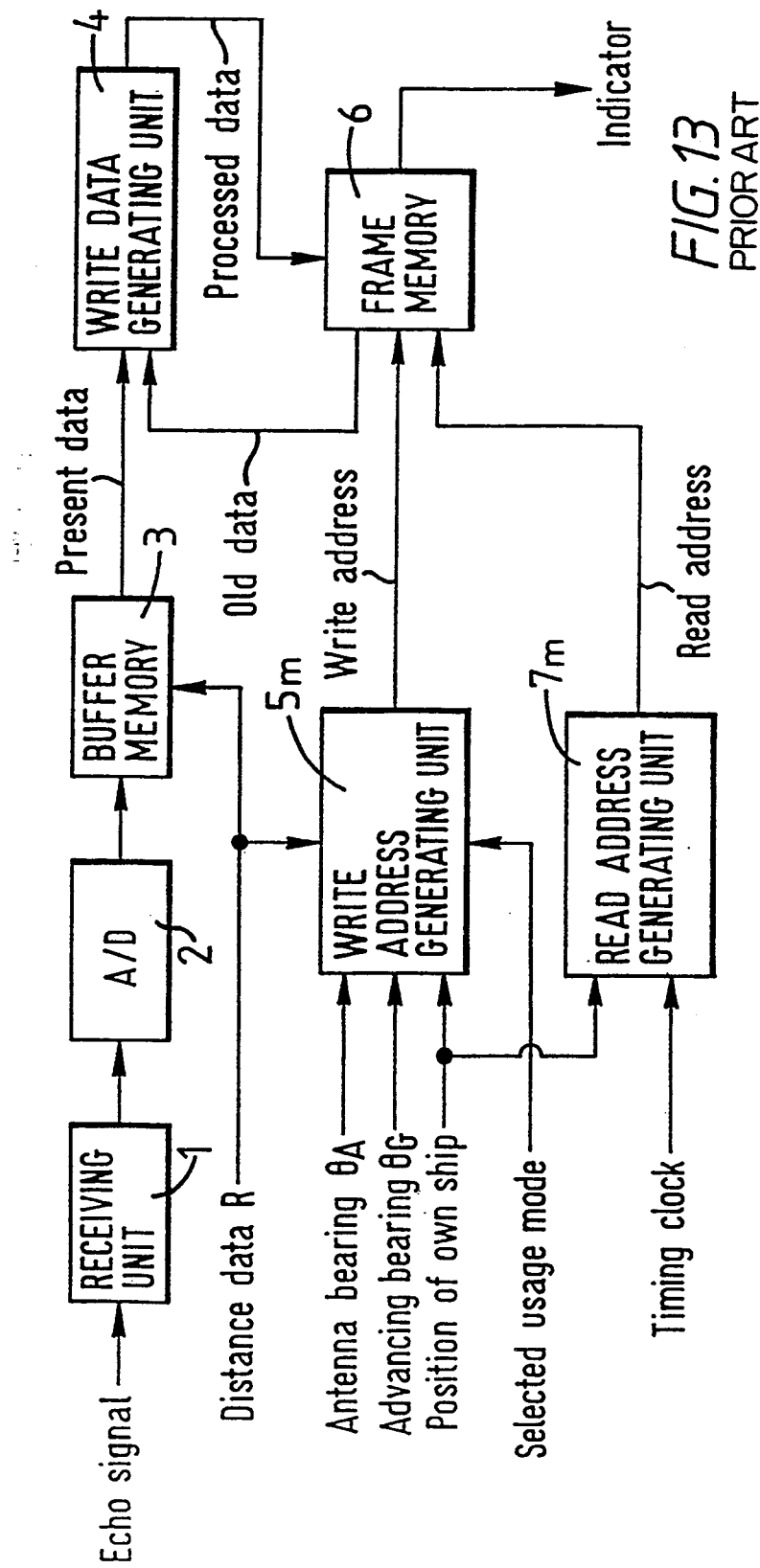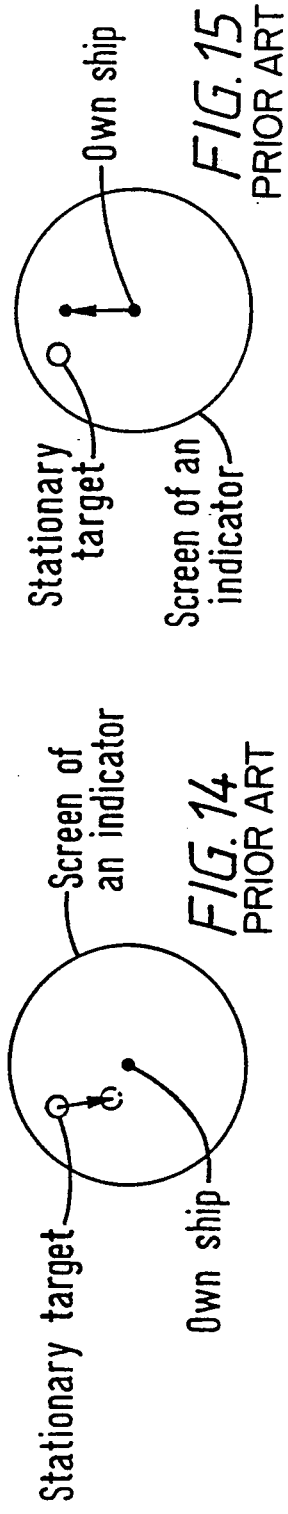

RADAR APPARATUS

This application is a continuation, of application Ser. No. 07/721,547 filed on Jul. 18, 1991, now abandoned.

TECHNICAL FIELD

The present invention relates to a radar apparatus which radiates radar search signals by a rotating antenna successively in different directions, receives resultant echo signals coming from the respective directions, stores echo signals coming from a wide range of directions in a display memory, reads out the echo signals from the display memory to supply the signals to an indicator and displays surrounding situations of the radar antenna on the display surface of the indicator. Specifically, the present invention relates to a radar apparatus which removes unwanted wave signals such as sea clutter and the like with any indication mode selected, displays echo signals in a manner that desired echo signals can be easily distinguished and tracks of other ships and the like can be appropriately indicated.

BACKGROUND ART

Firstly, there will be explained cases in which a ship equipped with a radar apparatus is at rest or the distance travelled by a moving ship per unit time can be disregarded.

There have been some conventional radar apparatuses which are provided with three display modes; North up display mode (hereinafter referred to as "NU display mode"), Helm-Perspective display mode (hereinafter referred to as "HP display mode"), and Course-up display mode (hereinafter referred to as "CU display mode"). These three display modes can be selected as desired.

① With NU display mode, the top of the display screen always represents the north as shown in the FIG. 4. For instance, when a course of ship is 0° (with respect to the north as a reference bearing), the heading line of the ship is located at the position shown by a solid line with an arrow. When the course of ship is changed by 90° clockwise (eastward), the heading line moves to a position shown by a dotted line with an arrow. But, immovable things such as buoys are displayed at the same points regardless of the course of the ship. In other words, displayed images represent a scenery an operator can see from the sky, not from the ship.

② With HP display mode, the top of the display screen always represents the heading line of the ship as shown in FIG. 5. For instance, a fixed image representing a fixed buoy and the like are located at an A1 position on the line when the course of the ship is adjusted to 0°, and the fixed image will move to an A2 position when the course of the ship is changed clockwise by 90°. Thus, the resultant displayed image becomes a scenery an operator can see on the ship.

③ With CU display mode, the top of the display screen always indicates a predetermined scheduled course, as shown in FIG. 6. For instance, when the course of the ship is set to a bearing 10°, the top of the display screen will always represent a bearing 10°. The heading line of the ship is indicated as a displayed solid line with an arrow when the ship is advancing along a predetermined scheduled course. However, when the actual proceeding course of the ship is changed in order to avoid yawing and obstacles, the heading line of the ship moves as shown by virtual lines on the screen. But, an image representative of an immovable target is displayed at the same point regardless of changes of the course of the ship.

Referring to FIG. 7, a receiving unit 1 receives, detects and amplifies echo signals resulting from each of respective search pulse signals radiated successively in different directions by means of a rotating radar antenna (not shown) and coming from one of the respective different directions. The analog reception signals resulting from one search pulse signal and produced by the receiving unit 1 are converted to digital signals by means of an A/D converting unit 2 and then stored in a buffer memory 3 in a time sequential fashion. The reception signals (echo data) from the buffer memory 3 are converted to image display data by a write data generating unit 4.

The write data generating unit 4 implements a scan correlation process on the echo signals caught by the radar antenna in order to eliminate unwanted echo signals such as echo signals reflected by the sea surface. This scan correlation process generates data signals for one rotation of the radar antenna by utilizing reception signals obtained during ten rotations of the radar antenna, for instance, as disclosed in patent publication of an unexamined Japanese patent application No. SHO 62-223681. The scan correlation process will be briefly explained. Reception signals received during a first rotation of the radar antenna are compared with receptions signals obtained during a second rotation of the antenna to produce comparison result data in accordance with predetermined relationships. Then, the comparison result data are compared with the reception signals caught during a third rotation of the antenna to produce new comparison result data. Thereafter, the same process is repeatedly performed to remove images due to unstable reflections as sea clutter. Thus, there are utilized to perform the scan correlation present reception signals supplied by the buffer memory 3 and old reception signals which have already been written and stored in the frame memory 6.

The output data produced from the write data generating unit 4 are written into memory elements of the frame memory 6 identified by write addresses generated by the write address generating unit 5. The data written into the frame memory 6 are read out based on read addresses generated by a read address generating unit 7 in compliance with a raster scanning method. The data read out are displayed as images on an indicator such as a CRT which is not shown.

The write address generating unit 5 generates write address signals representative of coordinates defined in Cartesian coordinates (X, Y) based on bearings of the antenna, a selected display mode and an advancing bearing of the own ship, thus performing a conversion from polar coordinates to Cartesian coordinates. This conversion is performed in accordance with the following equations.

$$X = X_C + R \sin \Theta, \quad Y = Y_C + R \cos \Theta$$

where $\Theta = \Theta_A$ in HU display mode selected; $\Theta = \Theta_A + \Theta_G$ in NU display mode selected; and $\Theta = \Theta_A + \Theta_G - \Theta_C$ in CU display mode selected.

$X_C$, $Y_C$ are addresses representative of a position of the ship in the frame memory; R is distance from the ship; $\Theta$ is an angle in a sweep direction with respect to Y-axis in the frame memory; $\Theta_A$ is an angle of the antenna with respect to the heading direction of the ship; $\Theta_G$ is an advancing bearing of the ship; and $\Theta_C$ is a selected course.

It should be noted that with the radar apparatus in the foregoing, if a raster scanning method is employed to read out the indication signals to the indicator, the write address generating unit 5 is constructed to perform coordinates conversion from polar coordinates to Cartesian coordinates. But, if a spiral scanning method is employed, it is not required to perform the coordinates conversion in the write address generating unit 5.

With NU display mode or CU display mode selected to display echo signals on an indicator, in cases in which the ship is at rest or the distance travelled per unit time by the moving ship can be neglected, data representative of fixed targets are written into the same memory elements of the frame memory 6 so that the fixed targets are displayed at fixed points on the screen of an indicator, even if data written into the frame memory 6 obtained during one rotation of the antenna are updated every moment. Thus, conventional radar apparatuses are also capable of appropriately performing a scan correlation process and removing undesired waves as sea clutter. However, while HP display mode is selected, the heading line of a ship equipped with a radar apparatus always changes so that data representative of fixed targets obtained during one rotation of the antenna may be written into different memory elements of the frame memory 6 every one rotation of the antenna. As a result, there is brought about a drawback that the scan correlation process cannot be done correctly and thus images representative of fixed targets move on the screen of an indicator every moment.

It should be noted that HP display mode is comparatively often used, since an actual scene observed by an operator directly corresponds to an image displayed on the screen of an indicator.

Further, with conventional radar apparatuses, tracks of targets cannot be displayed, when HP display mode is selected. In order to display tracks of targets, in short, reception signals presently being received are written into the frame memory into which old reception signals have been previously written. With HP display mode selected, when data written into the frame memory are updated every moment, the heading direction of the ship always moves so that reception signals being presently received can not be written into the same memory elements into which old reception signals have been stored. Accordingly, tracks of targets cannot be indicated accurately.

Next, there will be explained a case in which a ship equipped with a radar apparatus is moving and the distance advanced per unit time by the ship cannot be neglected.

A block diagram illustrating the construction of a conventional radar apparatus shown in FIG. 13 is almost the same as the block diagram of a conventional radar apparatus shown in FIG. 7. Differences between the block diagram of the conventional radar apparatus shown in FIG. 7 and the one in FIG. 13 are that signals representative of a position Of the ship are supplied to a write address generating unit 5m and a read address generating unit 7m. The output signals of the write data generating unit 4 are written into the frame memory 6 based on write address signals produced by the write address generating unit 5m. The data signals written into the frame memory 6 are read out based on read address signals produced by the read address generating unit 7m in accordance with a raster scanning method. The write address generating unit 5m converts points at which echo signals are produced defined with respect to the radar antenna in polar coordinates system to coordinates defined in Cartesian coordinates based on the antenna bearing, the advancing course of the ship, the position of the ship and a display mode selected.

It is to be noted that there are two kinds of motions, a relative motion (hereinafter referred to "RM") and a true motion (hereinafter referred to "TM"). RM displays the ship at a fixed position; and TM displays the ship being moved depending on distance travelled by the ship. One of the motions is selected by an operator by means of a mode selecting unit (not shown).

① As shown in FIG. 14, RM displays in a manner that the ship (the center of the radial radar sweeps) is fixed at a specific point (at the center in the drawing), and fixed targets are being moved on the screen of an indicator.

② As shown in FIG. 15, TM displays in manner that the ship (the center of the radial radar sweeps) is moved depending on its speed and proceeding bearing, and immovable targets are fixed.

In order to present these displays, the address of memory element of the frame memory 6 corresponding to the center of the radial radar sweeps is fixed or varied when data signals are written into the memory. In other words, the way to fix the center of the radial radar sweeps at an address of memory elements in the frame memory 6 is referred to as RM writing process. The other way to vary the address of memory elements corresponding to the center of the radial radar sweeps is referred to as TM writing process.

With regard to a starting address of memory element during an indication operation, there are two ways in the same way as the foregoing way to identify an address of memory elements corresponding to the center of the radial radar sweeps. One way is to fix the starting address at an address in the memory and is referred, for convenience, to RM reading process, and the other way is to vary the starting address in the memory and is referred to TM reading process.

The following four combinations of the writing processes and the reading process are selected and performed respectively.

Case 1

With a combination of RM writing process and RM reading process, both the writing area represented with a circle and the reading area represented with a rectangle are always fixed, as shown in FIG. 16(a). In this case, while the own ship (corresponding to the center of the radial radar sweeps) is always displayed at a fixed position on the screen of an indicator, targets are indicated at positions determined in accordance with the relative motion.

Case 2

With a combination of TM writing process and RM reading process, as shown in FIG. 16(b), the writing area represented with a circle in the frame memory 6 becomes variable, and the reading area represented with a rectangle is always fixed. In this case, targets are displayed at positions on the screen of an indicator in accordance with the true motion. The ship is displayed at positions displaced in a direction the ship is proceeding.

Case 3

With a combination of RM writing process and TM reading process, as shown in FIG. 16(c), the writing area represented with a circle in the frame memory 6 will be always fixed, and the reading area designated with a rectangle will be variable. In this case, while the ship is displayed as being moved in a direction the ship advances on the screen of an indicator, targets are indicated at positions determined in accordance with the true motion. But, read addresses are produced in a manner to identify memory elements in an opposite direction with respect to the advancing direction of the ship.

Case 4

With a combination of TM writing process and TM reading process, as shown in FIG. 16, both the writing area represented with a circle in the frame memory 6 and the reading area represented with a rectangle move by an amount corresponding to a distance travelled by the ship. In this case, the ship is always displayed at a fixed position on the screen of an indicator, and targets are indicated at positions determined in accordance with the relative motion.

With the cases 2 and 4, the address corresponding to the center of the radial radar sweeps is moved (scrolled) in the frame memory 6. With the cases 3 and 4, the read start address is moved (scrolled) in the memory.

First, with the case 2, the ship is no longer displayed when the address corresponding to the center of the radial radar sweeps in the writing area (corresponding to the own ship) to identify memory elements goes beyond the reading area in the frame memory 6. In order to avoid inconveniences, an operation has to be made to return an address corresponding to the center of the radial radar sweeps to the initial address for the center of the radar sweeps so that the writing area is in the reading area. For instance, as shown in FIG. 10, assuming that a position "P1" is an initial address corresponding to the center of the radial radar sweeps, an address corresponding to the center of the radial radar sweeps moves to $P_2$, →$P_3$ . . . , as the ship proceeds. When the address corresponding to the center of the radial radar sweeps reaches a point P3 on the boundary of the frame memory 6, a position P4 representing the next address corresponding to the center of the radar sweeps will be made returned to the position P1, since the ship is no longer displayed.

With the case 4, there is performed an operation to return the address corresponding to the center of the radial radar sweeps in the same way as with the case 2.

It is to be noted that the two movement modes of the RM and TM explained in the foregoing are provided with the advancing bearing of the ship to present displays. These two movement modes may be combined with the following three display modes using the advancing bearing of the ship. Generally, the RM is combined with any one of all the NU, HP and CU display modes which are shown in FIG. 4 through FIG. 6. While, the TM is combined with the NU display mode or the CU display mode, but not combined with the HP display mode.

Out of combinations of the three display modes and the two movement modes, TM-NU mode displays a ship on the screen which is seemingly moving on a map, and RM-HP mode displays a scene on the screen viewed by an operator on the ship.

When a ship equipped with a radar apparatus is moving at a fast speed or detection range of the radar apparatus is short, the distance travelled by the ship per unit time cannot be disregarded in applying, for instance, a scan correlation process on echo signals received by the radar antenna. In such a case, the scan correlation process is performed by utilizing present reception data supplied from the buffer memory 3 and old reception data which have been stored in the frame memory 6. Thus, the scan correlation process requires TM writing process which writes echo signals from fixed targets into the same memory elements in the frame memory 6. In other words, while the ship is moving and the distance travelled by the ship cannot be neglected, echo signals have to be written into the frame memory 6 in accordance with the TM writing process.

Also, for example, writing process with TM-NU mode, which corresponds to the cases 2 and 4, will bring up the following problems.

First, with the case 2, when the write area runs over the read area corresponding to the size of the screen of an indicator, a pull-back operation is necessary to change the write area regardless of the movement of the ship. Correct relative positional relationships between fixed or moving targets and the ship can no longer be maintained on the data having been stored, due to such mull-back operations, and thus, a continuous scan correlation process cannot be performed. Accordingly, data have to be accumulated again from scratch to allow scan correlation process to be implemented.

With the case 4, when both the write area and the read area move over the edge of the frame memory 6, both the write area and the read area have to be scrolled as in the foregoing, which makes the construction of the read address generating unit 7m as well as the write address generating unit 5m and the process performed therein complicated and which results in no continuous scan correlation to be made in the same way as with the case 2. Thus, old data will have to be accumulated again from the beginning in order to perform the scan correlation process. To reduce the frequency of the scroll execution, capacity of the frame memory 6 need to be expanded as largely as possible, which makes cost higher, however.

DISCLOSURE OF THE INVENTION

An object of the present invention is to provide a radar apparatus having a display memory which indicates echo signals so that undesired waves such as sea clutter and the like are eliminated and desired echo signals are easily distinguished.

Another object of the invention is to provide a radar apparatus having a display memory which is capable of performing scan correlation process precisely on echo signals received by the radar antenna when a HP display mode is selected.

Another object of the present invention is to provide a radar apparatus having a display memory which is capable of performing scan correlation process precisely on echo signals received by the radar antenna when either a NU display mode, a CU display mode, or a HP display mode is selected.

Another object of the present invention is to provide a radar apparatus which displays echo signals so that undesired echo signals such as sea clutter and the like are eliminated and desired echo signals are easily distinguished when there is selected a relative movement (hereinafter referred to "RM") display mode in which the ship is displayed at a fixed point.

Another object of the present invention is to provide a radar apparatus which is capable of displaying echo signals so that undesired echo signals such as sea clutter and the like are eliminated and desired echo signals are easily distinguished when a ship equipped with the radar apparatus is at rest or the distance travelled by the moving ship per unit time is neglected and the heading direction of the ship always changes.

Another object of the present invention is to provide a radar apparatus which is capable of displaying surrounding conditions with undesired echo signals such as sea clutter and the like eliminated when the ship equipped with the radar apparatus moves and the distance advanced by the ship per unit time cannot be neglected.

Another object of the present invention is to provide a radar apparatus having a display memory which is capable of displaying precisely tracks of other ships and the like.

Another object of the present invention is to provide a radar apparatus having a display memory which is capable of displaying precisely tracks of other ships and the like when a HP display mode is selected.

Another object of the present invention is to provide a radar apparatus having a display memory which is capable of displaying precisely tracks of other ships and the like when either a NU display mode, a CU display mode or a HP display mode is selected.

Another object of the present invention is to provide a radar apparatus which is capable of displaying precisely tracks of other ships and the like when there is selected a relative movement (hereinafter referred to "RM") display mode in which the ship is displayed at a fixed position.

Another object of the present invention is to provide a radar apparatus which is capable of displaying precisely tracks of other ships and the like when a ship equipped with the radar apparatus is at rest or the distance travelled per unit time by the moving ship can be neglected and the heading direction of the ship always changes.

Another object of the present invention is to provide a radar apparatus which is capable of displaying precisely tracks of other ships and the like and indicating fixed targets such as islands appropriately when a ship equipped with the radar apparatus moves and the distance advanced per unit time by the ship cannot be neglected.

Another object of the present invention is to provide a radar apparatus which is capable of performing a scan correlation process continuously and correctly while TM-NU mode is selected.

A first feature of the present invention is that a radar apparatus for successively radiating search signals in different directions, receiving echo signals and displaying the signals on an indicator so that surrounding conditions in a wide range of directions are displayed which comprises a receiving unit for receiving echo signals, a buffer memory for storing echo signals based on one search signal and supplied from the receiving unit, a process memory for storing echo signals coming from a wide range of directions in memory elements thereof determined with respect to a bearing, correlation means for performing a correlation process utilizing signals supplied by the buffer memory and the signals read out from the process memory and for supplying its resultant output signals to the process memory, a frame memory for storing the output signals of the correlation means in memory elements thereof determined with a selected display mode and an indicator for displaying the signals produced by the frame memory.

A second feature of the present invention is a radar apparatus for successively radiating search signals in different directions, receiving echo signals and displaying the signals on an indicator so that surrounding conditions in a wide range of directions are displayed which comprises a receiving unit for receiving echo signals, a buffer memory for storing echo signals based on one search signal and produced by the receiving unit, a first memory for storing input signals in corresponding memory elements thereof determined with respect to a bearing, signal process means for implementing a signal process by utilizing the signals outputted from the buffer memory and signals read out from the first memory and for outputting resultant signals representative of tracks of other ships, a second memory for storing the output signals representative of the tracks in memory elements determined in compliance with a selected display mode and an indicator for indicating the signals read out from the second memory.

A third feature of the present invention is a radar apparatus for successively radiating search signals in different directions, receiving echo signals and displaying the signals on an indicator so that surrounding conditions in a wide range of directions are displayed which comprises a receiving unit for receiving echo signals, a buffer memory for storing echo signals based on one search signal and produced by the receiving unit, a first memory for storing echo signals coming from a wide range of directions in memory elements thereof corresponding to points on the earth's surface at which the echo signals are generated respectively, correlation means for performing a correlation process on the signals outputted from the buffer memory and the signals read out from the first memory, a second memory for storing the output signals of the correlation means in memory elements thereof determined in accordance with a selected display mode and an indicator for indicating the signals read out from the second memory.

BRIEF DESCRIPTION OF DRAWINGS

FIG. 13 shows a block diagram of a conventional radar apparatus.

FIG. 14 shows an explanatory image displayed when RM mode is selected.

FIG. 15 shows an explanatory image displayed when TM mode is selected.

It should be noted that throughout the drawings, like components provided with the same reference numerals perform the same functions.

EMBODIMENTS

First, there will be explained a radar apparatus installed on a ship while the ship is at a rest or the distance travelled by the moving ship per unit time can be neglected.

Figure 1:
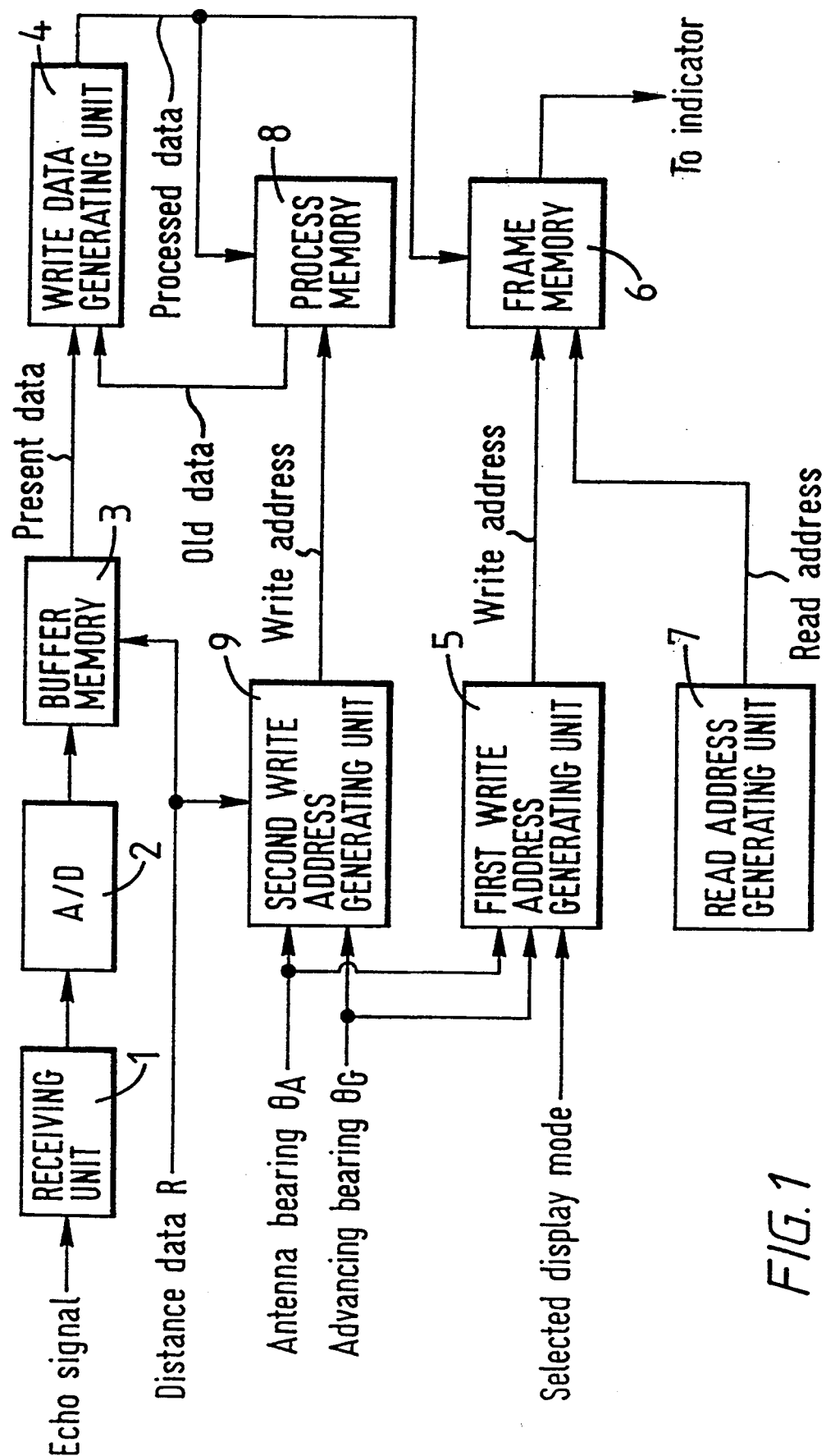
FIG. 1 shows a block diagram of an embodiment according to the present invention.

In FIG. 1, there is shown an embodiment according to the present invention which is capable of, regardless of a display mode selected, implementing a scan correlation process appropriately on echo signals and displaying echo signals so that undesired echo signals such as sea clutter and the like are eliminated and desired signals are displayed even when the heading direction of the ship always changes.

Referring to FIG. 1, a receiving unit 1 receives, detects and amplifies echo signals resulting from each of respective search pulse signals radiated successively in different directions by means of a rotating radar antenna (not shown) and coming from a corresponding one of respective different directions. The analog reception signals resulting from a search pulse signal and produced by the receiving unit 1 are converted to digital signals by means of an A/D converting unit 2 and then stored in a buffer memory 3 in a time sequential fashion. The write data generating unit 4 performs a scan correlation process on reception signals by utilizing echo data signals supplied from the buffer memory 3 and signals supplied from a process memory 8 to obtain data for indication. The output data of the write data generating unit 4 are written into memory elements of the process memory 8 identified by write addresses produced by a second write address generating unit 9 and are also written into memory elements of a frame memory 6 identified by write addresses produced by a first write address generating unit 5. The data written into the frame memory 6 are read out therefrom in response to read addresses produced by a read address generating unit 7 in accordance with a raster scanning method. The data thus read out are displayed on an indicator comprising a cathode-ray tube. The first write address generating unit 5 produces coordinates (X,Y) defined in Cartesian coordinates system based on the bearing of the radar antenna, a display mode selected and the heading bearing of the own ship, thus performing coordinates conversion from polar coordinates to Cartesian coordinates as explained in the foregoing. The second write address generating unit 9 generates address signals based on the bearing of the radar antenna, a selected display mode and the advancing bearing of the ship and supplies the process memory 8 with the address signals.

The process memory 8 writes the output signals of the write data generating unit 4 into memory elements thereof identified by address signals supplied from the second write address generating unit 9 in accordance with an NU display mode or a CU display mode. The frame memory 6 writes the output signals of the write data generating unit 4 into memory elements thereof identified by address signals supplied from the first write address generating unit 5 in accordance with a display mode selected as desired. The second write address generating unit 9 supplying address signals to the process memory 8 is constructed to generate write addresses in accordance with an NU display mode or a CU display mode. The write address generating unit 5 supplying address signals to the frame memory 6 is constructed to generate write addresses in accordance with either an NU display mode, an HP display mode or a CU display mode selected.

Figure 2:
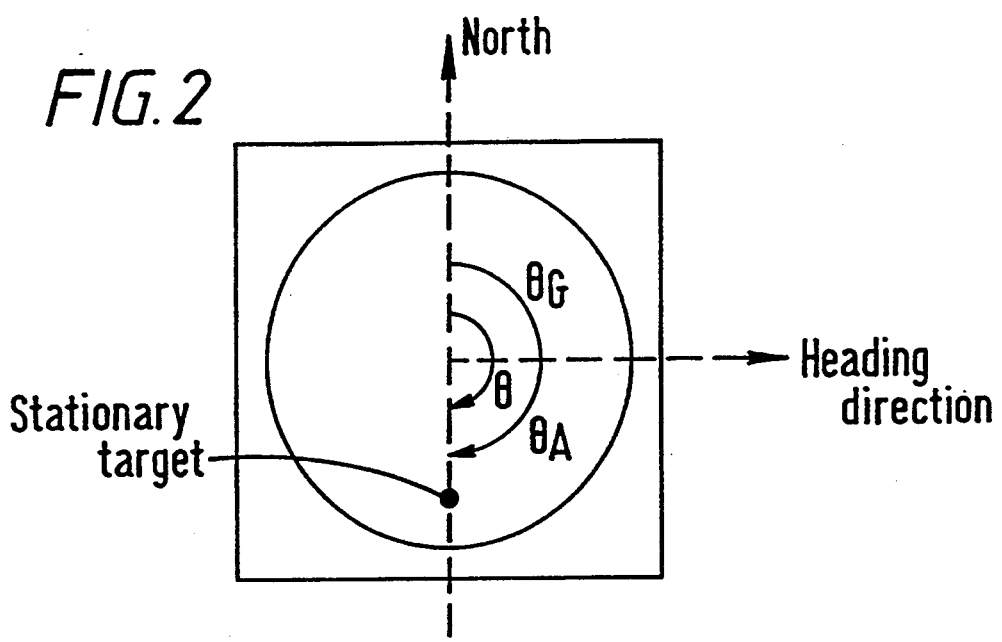
FIG. 2 shows a data map in a process memory used in FIG. 1.
Figure 3:
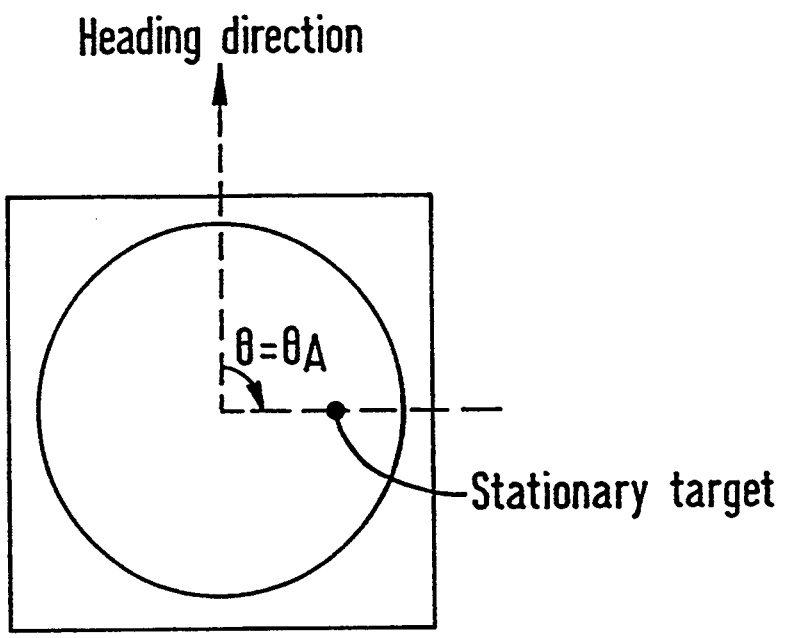
FIG. 3 shows a data map in a frame memory used in FIG. 1.
Figure 4:
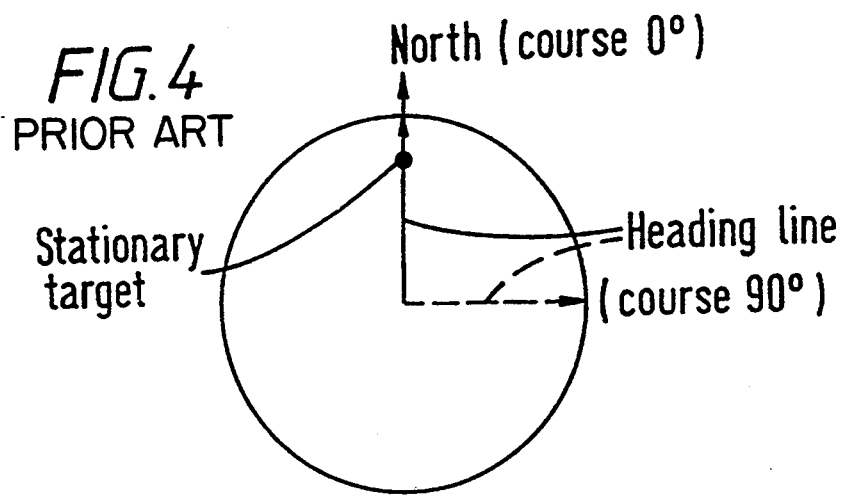
FIG. 4 shows an explanatory image displayed with NU display mode.
Figure 5:
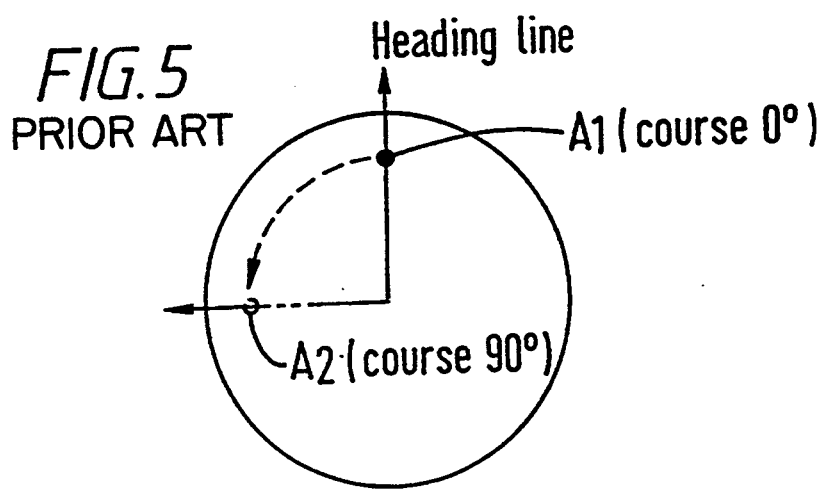
FIG. 5 shows an explanatory image displayed with HP display mode.
Figure 6:
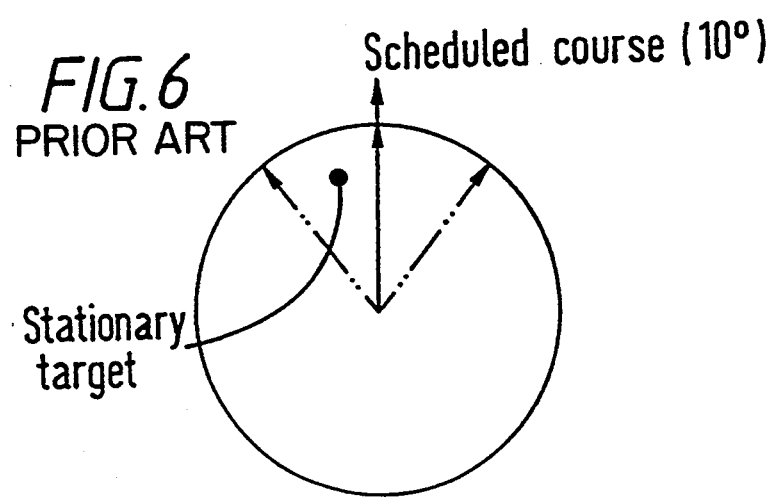
FIG. 6 shows an explanatory image displayed with CU display mode.
Figure 7:
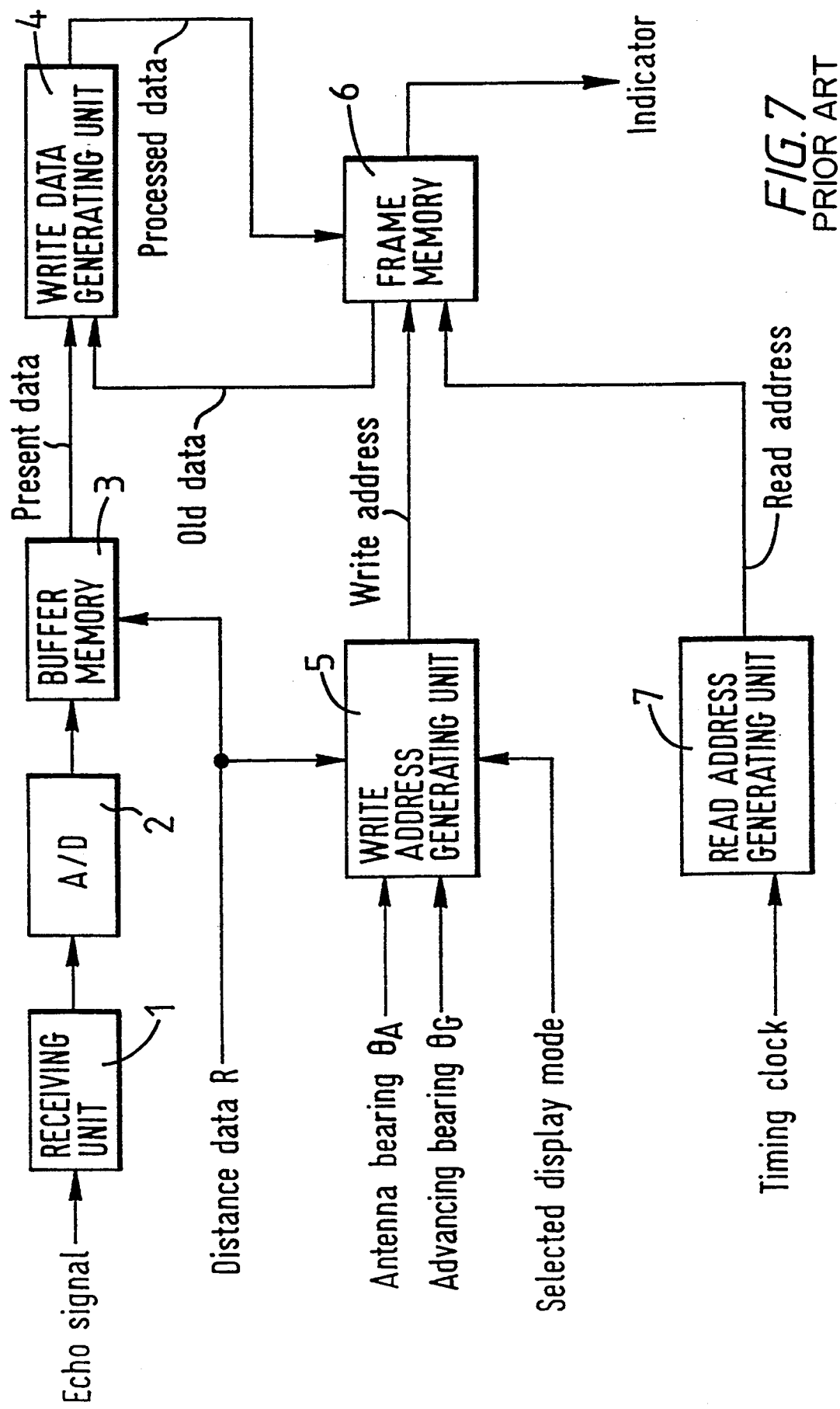
FIG. 7 shows a block diagram of a conventional radar apparatus.

For instance, assuming that the advancing bearing of the ship $\Theta_G = 90°$, the bearing of the radar antenna is 90°, and an HP display mode is selected, a data map is presented in the process memory 8 as shown in FIG. 2, and a data map is presented in the frame memory 6 as shown in FIG. 3. Thus, the data written into the process memory 8 are equivalent to the ones obtained by adding the advancing bearing of the ship to the data written into the process memory 8. The data written into the process memory and the data written into the frame memory 6 are the same with each other except this aspect of the advancing bearing. In a writing operation, the content in the process memory 8 is rotated and then written into the frame memory 6.

It is to be noted that although when an NU display mode or a CU display mode is selected, the process memory 8 writes signals into memory elements thereof determined with respect to the north or the advancing direction of the ship, echo signals can be written into memory elements thereof determined with respect to another desired bearing.

Next, an operation of the embodiment will be explained.

The data generated at the write data generating unit 4 are successively written into memory elements of the process memory 8 identified by write addresses produced by the second write address generating unit 9 in accordance with an NU display mode. The write data generating unit 4 implements a scan correlation process based on present data supplied from the buffer memory 3 and old data having been stored in the process memory 8 to generate the data written into the memory 8.

On the other hand, the data written into the process memory 8 are written into memory elements of the frame memory 6 identified by address signals produced by the first write address generating unit 5 in accordance with one of an HP display mode, an NU display mode and a CU display mode selected. The data written into the frame memory 6 are read out in response to read address signals produced by the read address generating unit 7 and are supplied to an indicator (not shown) for display. On the display surface of the indicator, there will be displayed an image exactly equivalent to the data map in the frame memory 6.

In other words, even while an HP display mode is selected, data are always written into memory elements of the process memory 8 identified by write addresses produced in accordance with an NU display mode. Precise correspondence between present data and previous data is achieved, and thus the scan correlation process is correctly implemented.

Figure 18:
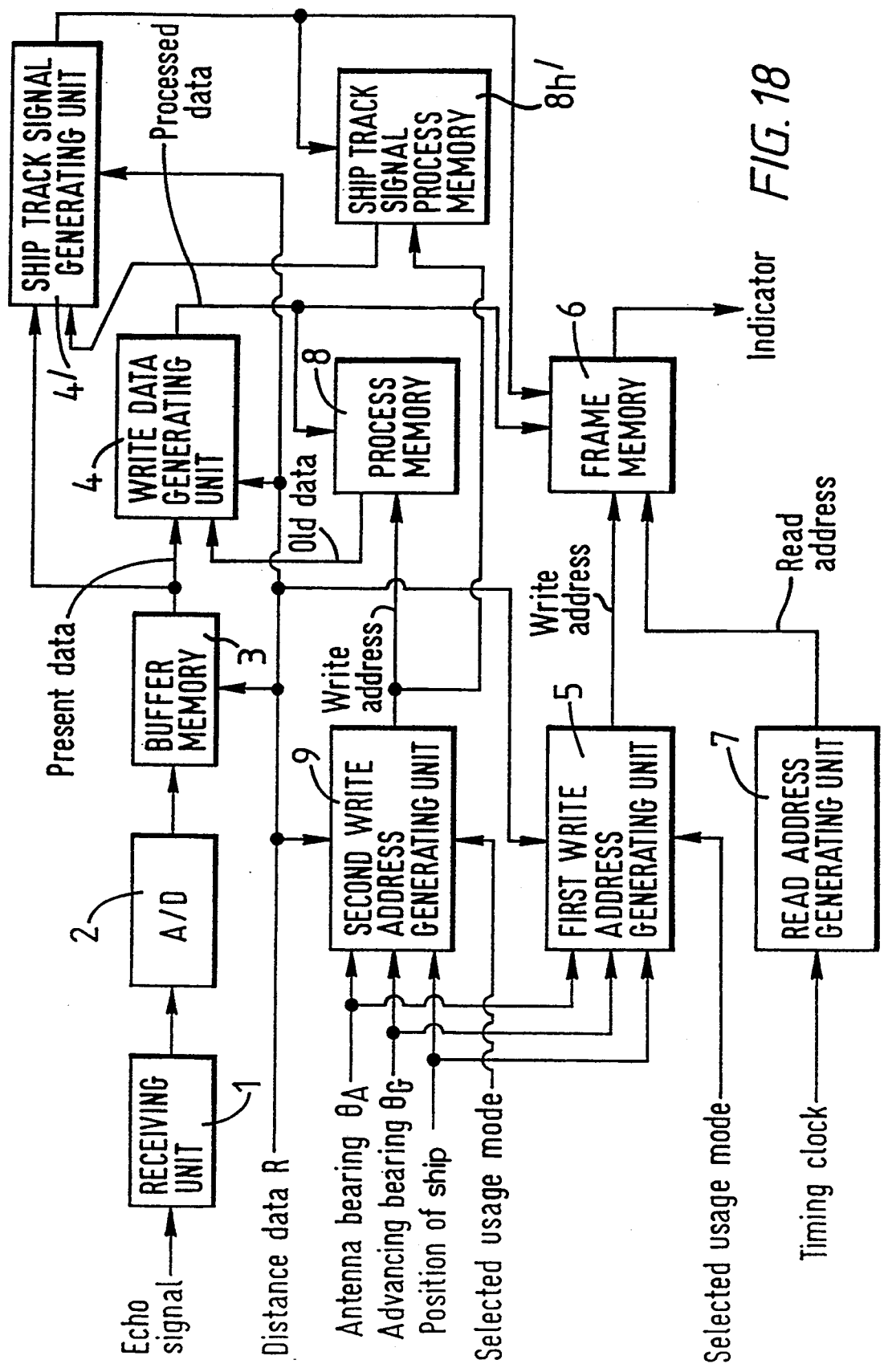
FIG. 18 shows a block diagram of another embodiment according to the present invention.

FIG. 18 shows an embodiment according to the present invention which is capable of displaying tracks of other ships correctly regardless of selected one of an HP display mode, an NU display mode and a CU display mode, even while a ship equipped with a radar apparatus is at rest or the distance travelled per unit time by the moving ship can be neglected.

Referring to FIG. 18, explanation is not made on portions of the block diagram shown therein which are the same as shown in FIG. 1 in terms of construction. In addition to the arrangement shown in FIG. 1, a ship track signal generating unit 4' and a ship track signal process memory 8h' are provided. The ship track signal generating unit 4' is supplied with echo signals as present signals from the buffer memory 3 and are also supplied from the ship track signal process memory 8h' with the signals as old signals having been stored therein. The ship track signal generating unit 4' generates ship track signals, based on new signals and the old signals, for displaying, for example, a ship track which is indicated for a predetermined time period and for displaying a ship track in a manner that a portion of the ship track representing the present position of the ship is displayed most brilliantly or the portions of the ship track become older the darker the portions are displayed. The ship track signal process memory 8h' is constructed in the same way as the process memory 8. The ship track signal process memory 8h' writes ship track signals supplied from the ship track signal generating unit 4' into memory elements thereof identified by address signals supplied from the second write address generating unit 9, with the memory elements of the memory 8h' corresponding to memory elements of the memory 8. The output signals of the ship track signal generating unit 4' and the output signals of the write data generating unit 4 are supplied to the frame memory 6 and written thereinto. Even when an HP display mode is selected, the ship track signal process memory 8h' writes data into memory elements of the memory 8h' identified by write addresses produced in accordance with an NU display mode in the same way as with the process memory 8. Thus, old data will be coincident exactly with new data at the memory 8h' so that the signal process will be performed correctly. The arrangement shown in FIG. 18 is capable of indicating tracks of other ships, islands and the like, even when an HP display mode is selected. Further, it is capable of eliminating unwanted echo signals such as sea clutter and the like and displaying surrounding conditions including tracks of other ships.

Figure 8:
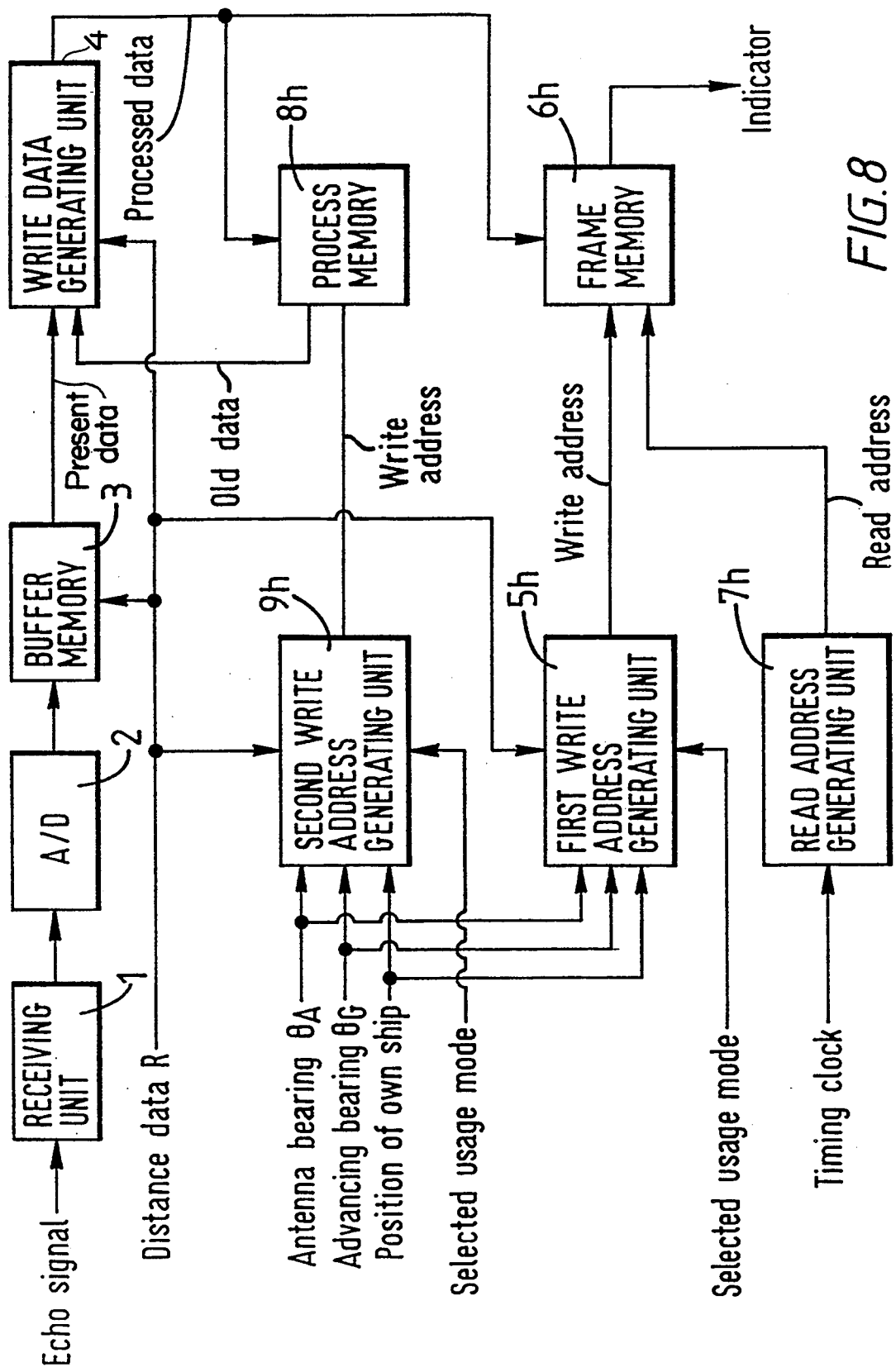
FIG. 8 shows a block diagram of an embodiment according to the present invention.

FIG. 8 shows an embodiment of the present invention which is capable of displaying surrounding conditions with undesired echo signals such as sea clutter and the like removed, when a ship equipped with a radar apparatus embodying the present invention is moving and a distance advanced by the ship per unit time cannot be neglected.

Referring to FIG. 8, the receiving unit 1 radiates search pulse signals successively in different directions by means of a rotating radar antenna (not shown), receives, demodulates and amplifies echo signals resulting from search pulse signals and coming from the respective directions. The analog reception signals resulting from one search signal and produced by the receiving unit 1 are converted by the A/D converting unit 2 to digital signals which are written into the buffer memory 3 in a time divisional fashion and stored therein. The reception signals (echo data) produced by the buffer memory 3 are converted to data for indication by the write data generating unit 4. The write data generating unit 4 applies a scan correlation process on echo signals received by the radar antenna to remove unwanted echo signals such as sea clutter and the like. The scan correlation process is performed by utilizing fresh reception signals supplied by the buffer memory 3 and old reception signals which have been stored in the process memory 8h. The output data of the write data generating unit 4 are written into memory elements of the process memory 8h identified by write addresses produced by a second write address generating unit 9h. The signals stored in the process memory 8h are read out in response to address signals produced by the second write address signal generating unit 9h and are supplied to the write data generating unit 4. The output data of the write data generating unit 4 are written into the frame memory 6h based on write addresses produced by the first write address generating unit 5h. The data written into the frame memory 6h are read out based on read addresses produced by the read address generating unit 7h and are displayed on an indicator (not shown). With this embodiment, a RM reading process is used at the read address generating unit 7h. The output data of the write data generating unit 4 are written into memory elements of the process memory 8h identified by write addresses produced by the second write address generating unit 9h, and at the same time are also written into the frame memory 6h based on write addresses produced by the write address generating unit 5h depending on a usage mode selected by an operator through a mode setting unit which is not shown. The second write address generating unit 9h converts points with respect to the radar antenna at which echo signals are generated respectively defined in polar coordinates system to corresponding ones defined in Cartesian coordinates based on an antenna bearing, an advancing bearing of the ship, the position of the ship and a selected display mode and produces write addresses defined in Cartesian coordinates system. The first write address generating unit 5h converts points with respect to the radar antenna at which echo signals are generated respectively defined in polar coordinates system to corresponding ones defined in Cartesian coordinates based on an antenna bearing, an advancing bearing of the ship, the position of the ship and a selected display mode and produces write addresses defined in Cartesian coordinates system.

When a TM.NU mode or a RM.HP mode is selected, the second write address generating unit 9h supplies write addresses to the process memory 8h so that data are always written into the memory 8h in compliance with the TM.NU mode.

Operations will be explained hereinafter when each of two combinations of modes explained in the foregoing is selected.

TM.NU Mode Selected

Figure 9A:
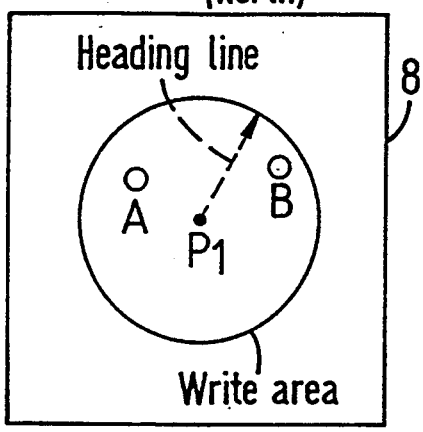
FIG. 9(a) through FIG. 9(c) show data maps in a process memory shown in FIG. 8.
Figure 9B:
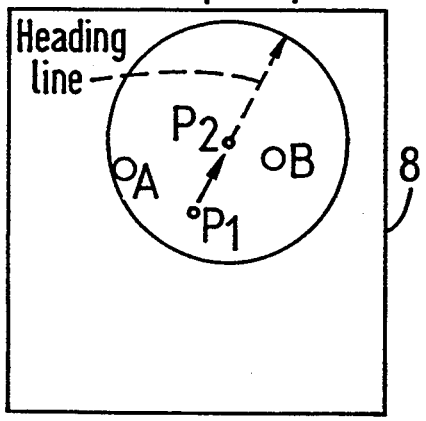
Figure 9C:
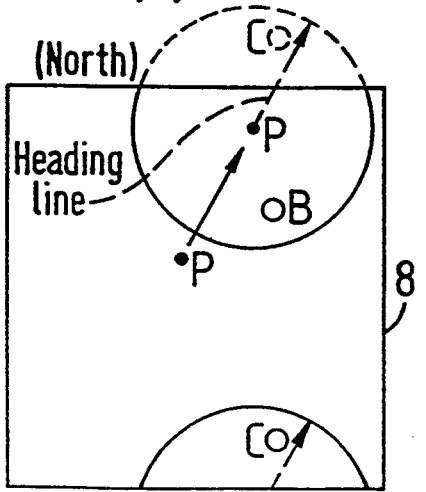
Figure 10A:
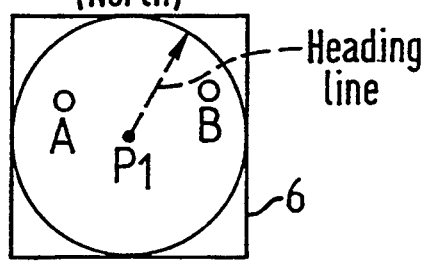
FIG. 10(a) through FIG. 10(c) show data maps in the frame memory shown in FIG. 8 when TM.NU mode is selected.
Figure 10B:
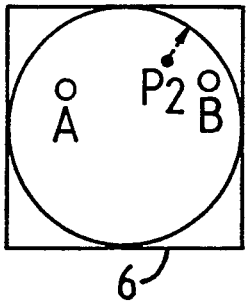
Figure 10C:
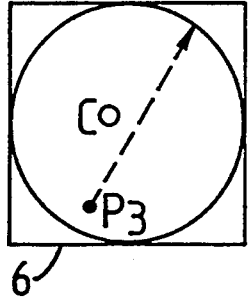

There are supplied the process memory 8h and the frame memory 6h with write addresses produced in compliance with the TM.NU mode selected. For instance, if the data in the process memory 8h are as shown in FIG. 9(a), data will be written correspondingly into the frame memory 6h as shown in FIG. 10(a). If data stored in the process memory 8h change in response to movements of the own ship from a state shown in FIG. 9(a) to another state shown in FIG. 9(b), and further to another state shown in FIG. 9(c), data in the frame memory 6h will change from a state shown in FIG. 10(a) to another state shown in FIG. 10(b), and further to another state shown in FIG. 10(c). In other words, targets are not affected by movements of the ship, and stationary targets A through C will be fixed in the process memory 8h. Although a pull-back operation will be applied to the content in the frame memory 6h, when the state in the memory 6h changes from a state shown in FIG. 10(b) to another state shown in FIG. 10(c), it is not necessary to perform the scan correlation process from the beginning. Actually, the content of the frame memory 6h is refreshed during one rotation of the beam formed by the antenna.

RM.HP Mode Selected

Figure 11A:
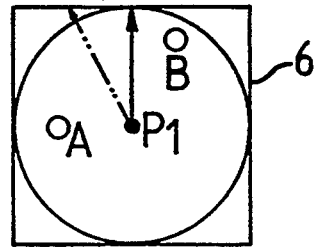
FIG. 11(a) through FIG. 11(c) show data maps in the frame memory shown in FIG. 8 when RM.HP mode is selected.
Figure 11B:
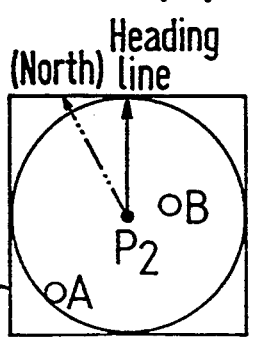
Figure 11C:
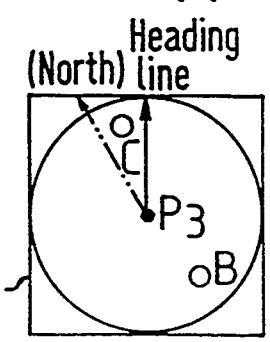

Write addresses produced in compliance with the TM.NU mode are supplied to the process memory 8h, while write addresses produced in accordance with the RM.HP mode are supplied to the frame memory 6h. For instance, if data stored in the process memory 8h are as shown in FIG. 9(a), data in the frame memory 6h will be as shown in FIG. 11(a). If the data in the process memory 8h change in response to movements of the own ship from a state shown in FIG. 9(a) to another state shwon in FIG. 9(b), and further to another state shown in FIG. 9(c), data in the frame memory 6h will change from a state shown in FIG. 11(a) to another state shown in FIG. 11(b) and further to another state shown in FIG. 11(c). Thus, also in this case, stationary targets will be fixed in the process memory 8h. It is to be noted that in this instance, data written into the frame memory 6h are the same as data written into the process memory 8h except that the data in the frame memory 6h are rotated by an angle corresponding to an advancing bearing $\Theta_G$ of the ship with respect to the data in the memory 8h. The data written into the process memory 8h are exactly the same as the data written into the frame memory 6h. The data written into the frame memory 6h are obtained by rotating the content in the process memory 8h, when the data are written into the frame memory 6h.

As explained in the foregoing, when any one of combinations of modes is selected, a data write area (represented with a circle) is moved in the process memory 8h based on movements of the ship. There will be briefly explained a process to move the center of the radial radar sweeps (own ship's position) in the process memory 8h in association with movements of the ship. To make an explanation thereof simple, the advancing bearing $\Theta_G$ of the ship is assumed to be constant.

Assuming that an X-address in the process memory 8h consists of n bits, the address representing the center of the radial radar sweeps changes in association with movements of the ship and data corresponding to n bits can always be used. For instance, it is assumed that "n" is equal to four. Although one increment to (0FH) with all the bits are "1s" respectively is "10H", the lower four bits are used to be as (00H). Accordingly, in this case, the X-address will be cyclic in a range from "00H" through "0FH", and thus the following phenomena will appear. This operation is performed at the second write address generating unit 9h.

Figure 12:
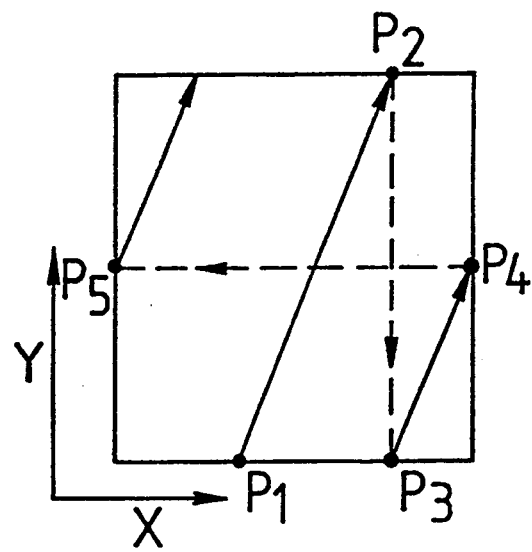
FIG. 12 shows a path of the address corresponding to the center of the radial radar sweeps (position of the own ship) which is drawn due to scrolling.
Figure 17:
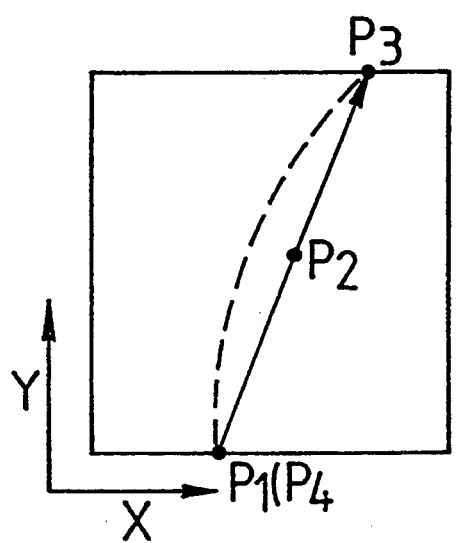
FIG. 17 shows a path of the address corresponding to the center of the radial radar sweeps (corresponding to the position of the ship), which is drawn due to scrolling.
Figure 16A:
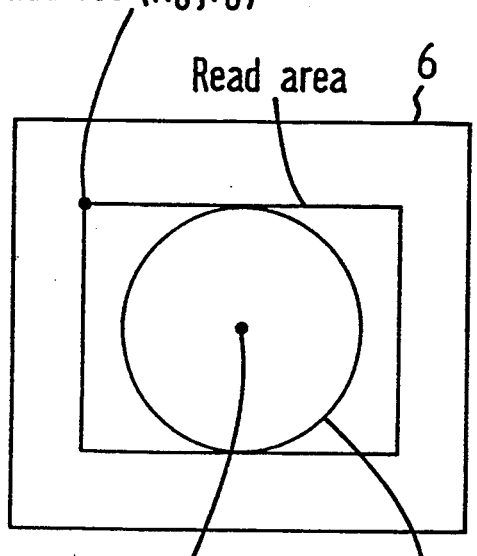
FIG. 16(a) through FIG. 16(d) show write areas and read areas in the frame memory corresponding to each of four combinations of write processes and read processes which have been conventionally performed.
Figure 16C:
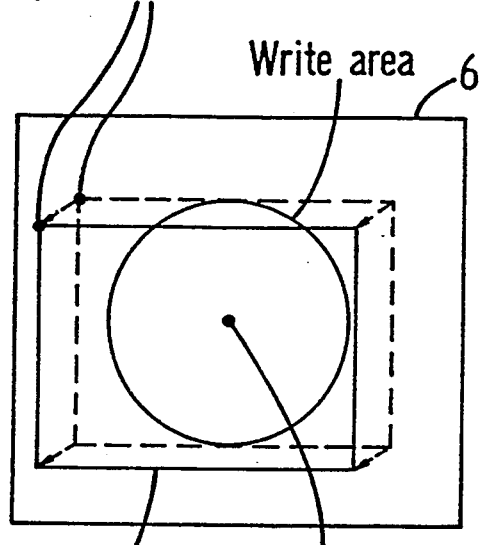
Figure 16B:
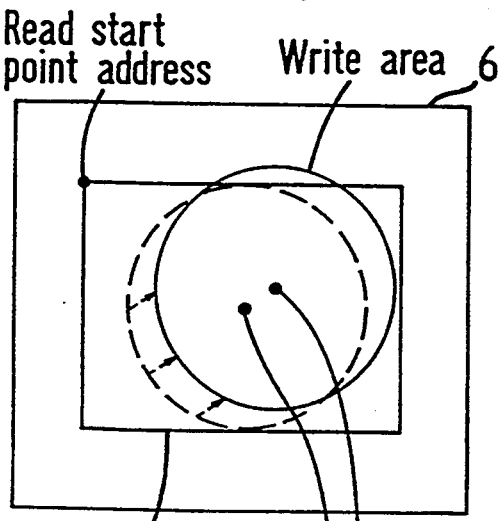
Figure 16D:
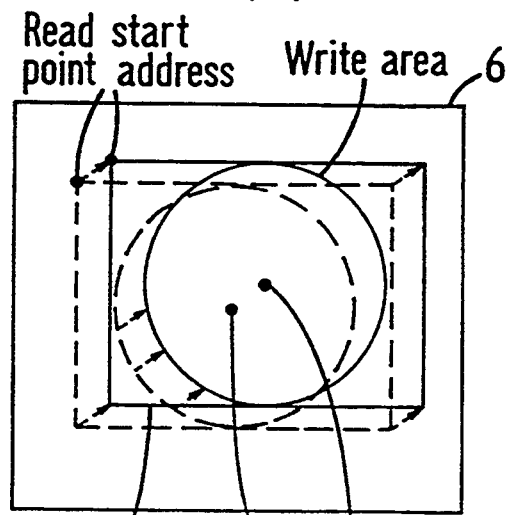

As shown in FIG. 12, the address corresponding to the center of the radial radar sweeps being initially at a position P1 is moved from the bottom of the drawing to another position P2 on the top thereof and to the right side. When the address corresponding to the center of the radar sweeps crosses the upper boundary of the process memory 8h, it is moved from the position P2 to a lower position P3 along a dotted line which is in parallel with Y-axis. When it is moved from the position P3 to another point P4, it is moved from the position P4 to a point P5 on the left side along a dotted line which is in parallel with X-axis. In this way, the address corresponding to the center of the radial radar sweeps will be successively varied.

It is to be noted that when the address corresponding to the center of the radial radar sweeps is in the vicinity of an edge of the process memory 8h, a portion of the write area represented with a circle will be outside the edge of the process memory 8h, data written into the portion of the write area which is outside of the memory are written into a lower portion of the process memory 8h, as explained with FIG. 12. In other words, when a portion of the write area represented with a circle goes beyond the upper edge of the process memory 8h, the portion will be moved to occupy a lower portion of the process memory 8h. If a portion of the write area defined with a circle goes beyond the right-hand edge of the memory, the portion outside of the memory will be moved leftward to occupy a portion on the left side in the process memory 8h.

With either one of the combinations of modes explained in the foregoing, there is used a RM read process for indication, in which the start address for reading out the content stored in the frame memory 6h is always fixed. This makes simpler the circuit configuration of the read address generating unit 7h and the process performed as compared with a conventional one requiring scroll operations. Further, the capacity of the frame memory 6h can be designed to substantially include the circular write area and thus can be made small as compared to a conventional frame memory 6 in which the start address for a reading operation is variable.

As explained in the foregoing, when either the TM.NU mode or RM.HP mode is selected, data are written into the process memory 8h based on write addresses produced in compliance with the TM.NU mode. Thus, memory elements of the process memory 8h into which data are written are identified without being affected by the bearing of the own ship and movements thereof so that coincidences between old data and new data can be correctly achieved. Portions of the write area going beyond the boundary of process memory 8h in association with movements of the address corresponding to the center of the radial radar sweeps will be in the memory so that all the data will be written into the memory. As a result, with the TM.NU mode selected, the scan correlation process can be continuously performed without any interruptions, and with the RM.NU mode selected, it becomes possible to correctly perform the scan correlation process which has been impossible to be conducted.

Figure 19:
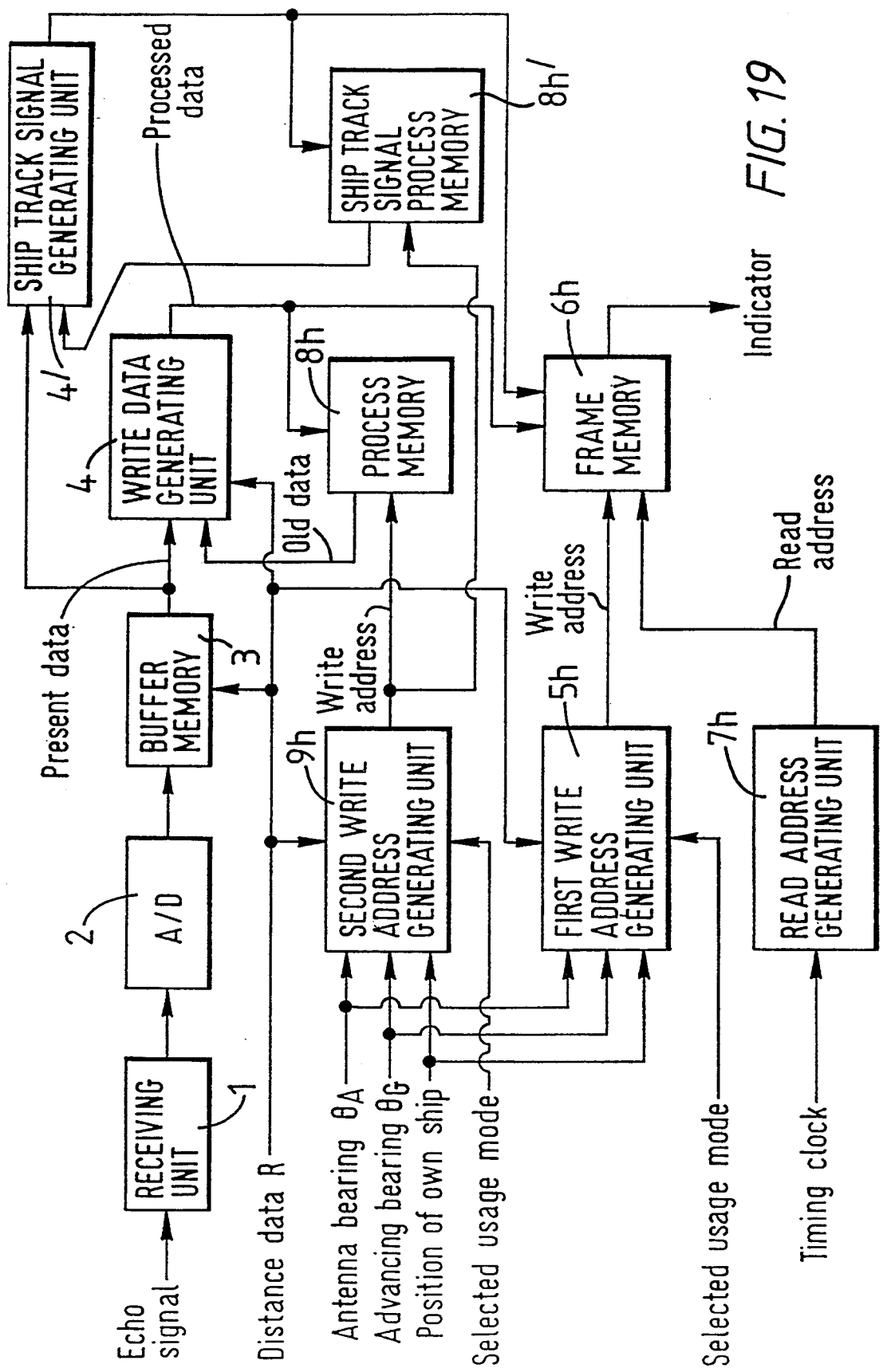
FIG. 19 shows a block diagram of another embodiment according to the present invention.

FIG. 19 shows an embodiment according to the present invention which is capable of displaying stationary targets such as islands and the like correctly and indicating true tracks of other ships in accordance with the RM.HP mode, even when a ship equipped with a radar apparatus is moving and the distance travelled by the ship per unit time can not be neglected.

Referring to FIG. 19, explanations will be neglected on portions of the block diagram shown therein which are the same as ones shown in FIG. 8. In addition to the arrangement shown in FIG. 8, there are provided a ship track signal generating unit 4' and a ship track signal process memory 8h'. The ship track signal generating unit 4' is supplied with echo signals as present signals from the buffer memory and with signals as old signals having been stored in the ship track signal process memory 8h' therefrom. The ship track signal generating unit 4' generates ship track signals based on the fresh signals and the old signals, which for instance last to be existent for a predetermined time period and are displayed in a manner that a portion of the ship track signals representative of the present position of the ship is indicated most brilliantly or portions of the ship track become older the darker the portions are displayed. The ship track signal process memory 8h' is constructed in the same way as the process memory 8h. The process memory 8h' writes ship track signals supplied from the ship track signal generating unit 4' into corresponding memory elements thereof in response to address signals supplied from the second write address generating unit 9h. The output signals of the ship track signal generating unit 4' and the output signals of the write data generating unit 4 are supplied to the frame memory 6h and written thereinto. The ship track signal process memory 8h' writes data into memory elements thereof based on write addresses produced in compliance with the TM.NU mode in the same way as the process memory 8h does. Precise correspondence between old data and fresh data can be achieved at the memory 8h' so that the signal process can be correctly carried out. Thus, the arrangement shown in FIG. 19 is capable of displaying tracks of other ships, islands and the like, even when the RM.HP mode is selected. It also is capable of displaying surrounding conditions including tracks of other ships with unwanted echo signals such as sea clutter and the like removed. With the RM.HP mode selected, true tracks of other ships can be indicated by providing the ship track signal process memory 8h' in addition to the process memory 8h and performing the process as in the foregoing. When the RM.HP mode is selected, fresh data are written into the process memory 8h based on write addresses produced in compliance with the TM.NU mode, and data are written into the ship track signal process memory 8h' based on write addresses produced in accordance with the TM.NU mode. Data from the present process memory and data from the previous process memory are written into memory elements of the frame memory 6h identified by write addresses produced in accordance with the RM.HP mode.

It should be noted that the embodiments according to the present invention respectively shown in FIG. 1, FIG. 8, FIG. 18 and FIG. 19, reading operations for indicating signals on an indicator are performed in accordance with a raster scanning method, and the first address generating unit and the second address generating unit perform coordinates conversions from polar coordinates to Cartesian coordinates and supply resultant address signals to the frame memory and the process memory respectively. But, even when a raster scanning method is employed to read out signals for indicating them on an indicator, it may be constructed in a way that the second address generating unit produces address signals defined in polar coordinates system and the first address generating unit generates address signals having converted coordinates defined in Cartesian coordinates system. If a spiral scanning method is employed to read out signals for indicating them on an indicator, the first address generating unit and the second address generating unit are not required to perform coordinates conversions from polar coordinates to Cartesian coordinates.

It should be noted that although with the embodiments according to the present invention shown in FIG. 8 and FIG. 19 in the foregoing, echo signals are written into the process memory based on write addresses produced in accordance with the TM.NU mode, the present invention should not be limited to the embodiments and should cover other embodiments in which echo signals are written into memory elements of the process memory corresponding to points on the surface of the earth at which the echo signals are generated respectively.

Effects Produced by the Invention

As explained in the foregoing, according to the present invention, there can be provided a radar apparatus operating in compliance with each of an HP display mode, an NU display mode and a CU display mode selected, which is capable of displaying surrounding conditions with undesired echo signals such as sea clutter and the like eliminated and indicating tracks of other ships and the like appropriately while a ship equipped with the radar apparatus is at rest, or when the ship is moving and the distance travelled by the ship per unit time can be neglected.

Further, the present invention provides a radar apparatus which is capable of displaying surrounding situations with unwanted echo signals such as sea clutter and the like removed, when the ship is moving and a distance travelled by the ship per unit time cannot be disregarded.

Further, with a simple construction to add the second write address generating unit, the present invention is capable of performing the scan correlation process continuously and correctly to provide easily-observable displayed images with unstable images resulting from sea clutter removed, when TM.NU mode is selected. A radar apparatus according to the present invention is capable of conducting the scan correlation process so that easily-distinguishable images can be obtained in the RM.HP mode, with the scan correlation process having been impossible to be performed with conventional radar apparatuses when the RM.HP mode is selected. The RM.HP mode is often used since it is easy to be used.

We claim:

1. A radar apparatus for successively radiating search signals in different directions, receiving echo signals and displaying the signals so that surrounding conditions in a wide range of directions are displayed, comprising:

a receiving unit for receiving echo signals;

a buffer memory for storing the received echo signals based on one search signal, said echo signals being supplied from the receiving unit;

a first memory for storing echo signals coming from a wide range of directions in memory elements thereof, the memory elements being determined with respect to a bearing;

correlation means for performing a correlation process upon signals supplied by said buffer memory and signals read from said first memory and for outputting resultant processed signals;

said first memory storing said resultant processed signals;

a second memory for storing said resultant processed signals outputted by said correlation means in memory elements thereof, said memory elements being determined by a selected display mode; and an indicator for displaying signals read from said second memory;

said first and second memories functioning in combination to remove unwanted sea clutter.

2. The radar apparatus as claimed in claim 1 wherein said first memory stores echo signals coming from a wide range of directions in memory elements thereof determined with respect to North.

3. The radar apparatus as claimed in claim 1 wherein said first memory stores echo signals coming from a wide range of directions in memory elements thereof determined with respect to an advancing bearing of the ship.

4. The radar apparatus as claimed in claim 1 wherein said resultant processed signals outputted by said correlation means are written into corresponding memory elements of said second memory determined by a head-up display mode.

5. A radar apparatus for successively radiating search signals in different directions, receiving echo signals and displaying the signals so that surrounding conditions in a wide range of directions are indicated, comprising:

a receiving unit for receiving echo signals;

a buffer memory for storing the received echo signals based on one search signal, said echo signals being supplied from the receiving unit;

a first memory for storing echo signals coming from a wide range of directions in memory elements thereof, the memory elements being determined with respect to a bearing;

signal process means for implementing a signal process upon signals produced by said buffer memory and signals read from said first memory and for outputting resultant signals representative of a track of another ship;

said first memory storing said resultant signals;

a second memory for storing said resultant signals outputted by said signal process means representative of the track of another ship in corresponding memory elements determined in compliance with a selected display mode; and an indicator for displaying signals read from said second memory;

said first and second memories functioning in combination to remove unwanted sea clutter.

6. A radar apparatus comprising:

a rotating antenna;

a gyro compass;

detection means for detecting a bearing of said rotating antenna;

display setting means for setting a helm-perspective display mode;

receiving means for receiving echo signals resulting from each search signal radiated in different directions by said rotating antenna;

a buffer memory for storing echo signals coming from a direction, said echo signals being produced by said receiving means;

write data generating means for generating data for picture indication based on output data from said buffer memory;

a frame memory for storing data generated by said write data generating means;

first write address generating means for generating write addresses for writing data into said frame memory based on data supplied from said gyro compass, said detection means and said display mode setting means;

read address generating means for providing said frame memory with read addresses;

an indicator for displaying data read from said frame memory;

a process memory for storing data read from said write data generating means;

said process memory being provided independently of said frame memory; and second write address generating means for producing write addresses determined with respect to a bearing based on output data of said gyro compass and said detection means, said write addresses being supplied to said process memory;

said frame memory and said process memory functioning in combination to remove unwanted sea clutter.

7. The radar apparatus as claimed in claim 6 wherein said read address generating means provides said frame memory with read addresses produced in accordance with a raster scanning method.

8. The radar apparatus as claimed in claim 6 wherein said read address generating means provides said frame memory with read addresses produced in accordance with a spiral scanning method.

9. The radar apparatus as claimed in claim 7 wherein said second write address generating means produces write addresses determined with respect to North, with said write addresses being supplied to said process memory.

10. The radar apparatus as claimed in claim 7 wherein said second write address generating means produces write addresses determined with respect to an advancing bearing of the ship, with said write addresses being supplied to said process memory.

11. A radar apparatus for successively radiating search signals in different directions, receiving echo signals and displaying the signals so that surrounding conditions in a wide range of directions are displayed, comprising:

receiving means for receiving echo signals;

a buffer memory for storing the received echo signals resulting from one search signal, said echo signals being produced by said receiving means;

a first memory for storing echo signals coming from a wide range of directions in memory elements corresponding to points on a surface of the Earth at which said echo signals are generated respectively;

correlation means for performing a correlation process upon signals outputted from said buffer memory and signals read from said first memory;

a second memory for storing signals outputted from said correlation means in corresponding memory elements determined in compliance with a display mode; and an indicator for displaying signals read from said second memory;

said first and second memories functioning in combination to remove unwanted sea clutter.

12. A radar apparatus comprising:

a gyro compass;

detection means for detecting a bearing of an antenna;

mode setting means for setting a usage mode obtained by appropriately combining one of a relative motion mode and a true motion mode and one of a north-up display mode, a helm-perspective display mode and a course-up display mode;

receiving means for receiving echo signals resulting from each search signal radiated in different directions by the antenna;

a buffer memory for storing echo signals coming from a direction, said echo signals being produced by said receiving means;

write data generating means for generating data for picture indication based on output data from said buffer memory;

a frame memory for storing data generated by said write data generating means;

first write address generating means for generating write addresses for writing data into said frame memory based on data supplied from said gyro compass, said detection means and said mode setting means;

read address generating means for providing an address corresponding to a fixed point in said frame memory as a start address for a reading operation;

an indicator for displaying the data read from said frame memory;

a process memory for storing data outputted from said write data generating means;

said process memory being provided independently of said frame memory; and second write address generating means for producing a continuous series of write addresses in compliance with a true north-up mode to write data which go beyond a boundary of said process memory into a portion in said process memory based on data outputted from both said gyro compass and said detection means and data representative of a distance from a center of a radial radar sweep when one of a true-motion north-up mode and a relative-motion helm-perspective mode is selected.

13. A radar apparatus for successively radiating search signals in different directions, receiving echo signals and displaying the signals so that surrounding conditions in a wide range of directions are displayed comprising:

receiving means for receiving echo signals;

first memory means for storing echo signals coming from a wide range of directions in memory elements thereof, the memory elements being determined by a relative motion mode combined with one of a north-up and a course-up mode;

correlation means for performing a correlation process upon signals supplied by said receiving means and signals read from said first memory means and for outputting resultant processed signals;

second memory means for storing the resultant processed signals outputted by said correlation means in memory elements thereof, said memory elements being determined by a combination of a relative motion mode and a helm-perspective mode; and indicator means for displaying signals read from said second memory means.

14. The radar apparatus as claimed in claim 13 wherein said first memory means stores echo signals coming from a wide range of directions in memory elements thereof determined with respect to North.

15. The radar apparatus as claimed in claim 13 wherein said first memory means stores echo signals coming from a wide range of directions in memory elements thereof determined with respect to an advancing bearing of the ship.

16. The radar apparatus as claimed in claim 13 wherein said resultant processed signals outputted by said correlation means are written into corresponding memory elements of said second memory means determined by a helm-perspective display mode.

17. A radar apparatus for successively radiating search signals in different directions, receiving echo signals and displaying the signals so that surrounding conditions in a wide range of directions are indicated, comprising:

receiving means for receiving echo signals;

first memory means for storing echo signals coming from a wide range of directions in memory elements thereof, the memory elements being determined by a combination of a relative motion made and one of a north-up or a course-up mode;

signal process means for implementing a signal process on signals produced by said receiving means and signals read from said first memory means and for outputting resultant signals representative of a track of another ship;

said first memory means storing said resultant signals;

second memory means for storing the processed signals outputted by said signal process means representative of the track of another ship in corresponding memory elements determined by a combination of a relative motion mode and a helm-perspective mode; and indicator means for displaying signals read from said second memory means.

18. A radar apparatus for successively radiating search signals in different directions, receiving echo signals and displaying the signals so that surrounding conditions in a wide range of directions are indicated, comprising:

receiving means for receiving echo signals;

buffer memory means for storing the received echo signals based on one search signal, said echo signals being supplied from said receiving means;

first memory means for storing echo signals coming from a wide range of directions in memory elements thereof, the memory elements being determined with respect to a bearing;

signal process means for implementing a signal process on signals produced by said buffer memory means and signals read from said first memory means and for outputting resultant signals representative of a track of another ship;

said first memory means storing said resultant signals;

second memory means for storing the processed signals outputted by said signal process means representative of the track of another ship in corresponding memory elements determined in compliance with a selected display mode; and indicator means for displaying signals read from said second memory means;

said first and second memory means functioning in combination to remove unwanted sea clutter.

19. The radar apparatus as claimed in claim 18 wherein said read address generating means provides said frame memory means with read addresses produced in accordance with a raster scanning method.

20. The radar apparatus as claimed in claim 18 wherein said read address generating means provides said frame memory means with read addresses produced in accordance with a spiral scanning method.

21. The radar apparatus as claimed in claim 19 wherein said second write address generating means produces write addresses determined with respect to North, with said write addresses being supplied to said process memory means.

22. The radar apparatus as claimed in claim 19 wherein said second write address generating means produces write addresses determined with respect to an advancing bearing of the ship, with said write addresses being supplied to said process memory means.

23. A radar apparatus for successively radiating search signals in different directions, receiving echo signals and displaying the signals so that surrounding conditions in a wide range of directions are displayed, comprising:

receiving means for receiving echo signals;

first memory means for storing echo signals coming from a wide range of directions in memory elements respectively determined by a combination of a true motion mode and one of a north-up or a course-up mode;

correlation means for performing a correlation process upon signals outputted from said receiving means and signals read from said first memory means;

second memory means for storing signals outputted from said correlation means in corresponding memory elements determined by a combination of a relative motion mode and a helm-perspective mode; and indicator means for displaying signals read form said second memory means.

24. A radar apparatus comprising:

a gyro compass;

detection means for detecting a bearing of an antenna;

mode setting means for setting a usage mode obtained by appropriately combining one of a relative motion mode and a true motion mode and one of a north-up display mode, a helm-perspective display mode and a course-up display mode;

receiving means for receiving echo signals resulting from each search signal radiated in different directions by the antenna;

buffer memory means for storing echo signals coming from a direction, said echo signals being produced by said receiving means;

write data generating means for generating data for picture indication based on output data from said buffer memory;

frame memory means for storing data generated by said write data generating means;

first write address generating means for generating write addresses for writing data into said frame memory means based on data supplied from said gyro compass, said detection means and said mode setting means;

read address generating means for providing an address corresponding to a fixed point in said frame memory means as a start address for a reading operation;

indicator means for displaying the data read from said frame memory means;

process memory means for storing data outputted from said write data generating means;

said process memory means being provided independently of said frame memory means; and second write address generating means for producing a continuous series of write addresses in compliance with a true north-up mode to write data which go beyond a boundary of said process memory means into a portion in said process memory means based on data outputted from both said gyro compass and said detection means and data representative of a distance from a center of a radial radar sweep when one of a true-motion north-up mode and a relative-motion helm-perspective mode is selected.

25. A method for successively radiating search signals in different directions, receiving echo signals and displaying the signals so that surrounding conditions in a wide range of directions are displayed, comprising the steps of:

(a) receiving echo signals;

(b) storing the received echo signals based on one search signal in a first memory the echo signals being supplied from said step (a);

(c) storing echo signals coming from a wide range of directions in memory elements of a second memory, the memory elements being determined with respect to a bearing;

(d) performing a correlation process upon signals supplied by the first memory and signals read from the second memory and outputting resultant processed signals;

(e) storing the resultant processed signals in the second memory;

(f) storing the resultant processed signals in memory elements of a third memory, the memory elements being determined by a selected display mode; and (g) displaying signals read from the third memory;

said steps (e) and (f) functioning in combination to remove unwanted sea clutter.

26. The method as claimed in claim 25 wherein the second memory stores echo signals coming from a wide range of directions in memory elements thereof determined with respect to North.

27. The method as claimed in claim 25 wherein the second memory stores echo signals coming from a wide range of directions in memory elements thereof determined with respect to an advancing bearing of the ship.

28. The method as claimed in claim 25 wherein the resultant processed signals are written into corresponding memory elements of the third memory determined by a helm-perspective display mode.

29. A method for successively radiating search signals in different directions, receiving echo signals and displaying the signals so that surrounding conditions in a wide range of directions are indicated, comprising the steps of:

(a) receiving echo signals;

(b) storing the received echo signals based on one search signal in a first memory, the echo signals being supplied by said step (a);

(c) storing echo signals coming from a wide range of directions in memory elements of a second memory, the memory elements being determined with respect to a bearing;

(d) implementing a signal process on signals produced by the first memory and signals read from the second memory and outputting resultant signals representative of a track of another ship;

(e) storing the resultant signals in the second memory;

(f) storing the resultant signals representative of the track of another ship in corresponding memory elements of a third memory determined in compliance with a selected display mode; and (g) displaying signals read from the third memory;

said steps (e) and (f) functioning in combination to remove unwanted sea clutter.

30. A method for detecting objects around a ship, comprising the steps of:
(a) transmitting search signals;
(b) determining a bearing of the ship;
(c) detecting a bearing of the search signals;
(d) setting a helm-perspective display mode;
(e) receiving echo signals resulting from each search signal radiated in different directions;
(f) storing echo signals coming from a direction in a first memory, the echo signals being produced by said step (e);
(g) generating data for picture indication based on output data from the first memory;
(h) storing data generated in said step (g) in a frame memory;
(i) generating write addresses for writing data into the frame memory based on data supplied from said step (b), said step (c), and said step (d);
(j) providing the frame memory with read addresses;
(k) displaying data read from the frame memory;
(l) storing data generated in said step (g) in a process memory, the process memory being provided independently of the frame memory; and
(m) producing write addresses determined with respect to a bearing based on output data of said step (b) and said step (c), the write addresses being supplied to the process memory.

31. The method as claimed in claim 30 wherein said step (j) provides the frame memory with read addresses produced in accordance with a raster scanning method.

32. The method as claimed in claim 30 wherein said step (j) provides the frame memory with read addresses produced in accordance with a spiral scanning method.

33. The method as claimed in claim 31 wherein said step (m) produces write addresses determined with respect to North, with the write addresses being supplied to the process memory.

34. The method as claimed in claim 31 wherein said step (m) produces write addresses determined with respect to an advancing bearing of the ship, with the write addresses being supplied to the process memory.

35. A method for successively radiating search signals in different directions, receiving echo signals and displaying the signals so that surrounding conditions in a wide range of directions are displayed, comprising the steps of:
(a) receiving echo signals;
(b) storing the received echo signals resulting from one search signal in a first memory, the echo signals being produced by said step (a);
(c) storing echo signals coming from a wide range of directions in memory elements of a second memory corresponding to points on a surface of the Earth at which the echo signals are generated respectively;
(d) performing a correlation process upon signals outputted from the first memory and signals read from the second memory;
(e) storing signals generated in said step (d) in corresponding memory elements of a third memory determined in compliance with a display mode; and
(f) displaying signals read from the third memory;
said steps (c) and (e) functioning in combination to remove unwanted sea clutter.

36. A method for detecting objects around a ship, comprising the steps of:
(a) determining a bearing of the ship;
(b) detecting a bearing of an antenna;
(c) setting a usage mode obtained by appropriately combining one of a relative motion mode and a true motion mode and one of a north-up display mode, a helm-perspective display mode and a course-up display mode;
(d) receiving echo signals resulting from each search signal radiated in different directions by the antenna;
(e) storing echo signals coming from a direction in a buffer memory, the echo signals being produced by said step (d);
(f) generating data for picture indication based on output data from the buffer memory;
(g) storing data generated in said step (f) in a frame memory;
(h) generating write addresses for writing data into the frame memory based on data supplied from said step (a), said step (b) and said step (c);
(i) providing an address corresponding to a fixed point in the frame memory as a start address for a reading operation;
(j) displaying the data read from the frame memory;
(k) storing data generated in said step (f) in a process memory, the process memory being provided independently of the frame memory; and
(l) producing a continuous series of write addresses in compliance with a true north-up mode to write data which go beyond a boundary of the process memory into a portion in the process memory based on data outputted from both said step (a) and said step (b) and data representative of a distance from a center of a radial radar sweep when one of a true-motion north-up mode and a relative-motion helm-perspective mode is selected.

37. The radar apparatus as claimed in claim 8 wherein said second write address generating means produces write addresses determined with respect to North, with said write addresses being supplied to said process memory.

38. The radar apparatus as claimed in claim 8 wherein said second write address generating means produces write addresses determined with respect to an advancing bearing of the ship, with said write addresses being supplied to said process memory.

39. The radar apparatus as claimed in claim 20 wherein said second write address generating means produces write addresses determined with respect to North, with said write addresses being supplied to said process memory means.

40. The radar apparatus as claimed in claim 20 wherein said second write address generating means produces write addresses determined with respect to an advancing bearing of the ship, with said write addresses being supplied to said process memory means.

41. The method as claimed in claim 32 wherein said step (m) produces write addresses determined with respect to North, with the write addresses being supplied to the process memory.

42. The method as claimed in claim 32 wherein said step (m) produces write addresses determined with respect to an advancing bearing of the ship, with the write addresses being supplied to the process memory.

43. A radar apparatus for successively radiating search signals in different directions, receiving echo signals and displaying the signals so that surrounding conditions in a wide range of directions are displayed, comprising:
   receiving means for receiving echo signals;
   a buffer memory for storing the received echo signals resulting from one search signal, said echo signals being produced by said receiving means;
   a first memory for storing echo signals coming from a wide range of directions in memory elements corresponding to points on a surface of the Earth at which said echo signals are generated respectively;
   correlation means for performing a correlation process upon signals outputting from said buffer memory and signals read from said first memory;
   said first memory storing the processed signals produced by said correlation means;
   a second memory for storing signals outputted from said correlation means in corresponding memory elements determined by a helm-perspective display mode; and
   an indicator for displaying signals read from said second memory;
   the first and second memories functioning in combination to remove unwanted sea clutter.

44. A radar apparatus for successively radiating search signals in different directions, receiving echo signals and displaying the signals so that surrounding conditions in a wide range of directions are indicated, comprising:
   receiving means for receiving echo signals;
   buffer memory means for storing the received echo signals based on one search signal, said echo signals being supplied from said receiving means;
   first memory means for storing echo signals coming from a wide range of directions in memory elements thereof corresponding to points on a surface of the Earth at which said echo signals are generated respectively;
   signal process means for implementing a signal process on signals produced by said buffer memory means and signals read from said first memory means and for outputting resultant signals representative of a track of another ship;
   said first memory means storing said resultant signals;
   second memory means for storing the processed signals outputted by said signal process means representative of the track of another ship in corresponding memory elements determined by a helm-perspective display mode; and
   an indicator for displaying signals read from said second memory means.

45. A radar apparatus for successively radiating search signals in different directions, receiving echo signals and displaying the signals so that surrounding conditions in a wide range of directions are displayed, comprising:
   receiving means for receiving echo signals;
   buffer memory means for storing the received echo signals resulting from one search signal, said echo signals being produced by said receiving means;
   first memory means for storing echo signals coming from a wide range of directions in memory elements thereof corresponding to points on a surface of the Earth at which said echo signals are generated respectively;
   correlation means for performing a correlation process upon signals outputted from said buffer memory and signals read from said first memory means;
   said first memory means storing the processed signals produced by said correlation means;
   second memory means for storing echo signals coming from the wide range of directions in memory elements thereof corresponding to points on a surface of the Earth at which said echo signals are generated respectively;
   signal process means for implementing a signal process on signals produced by said buffer memory means and signals read from said second memory means and for outputting resultant signals representative of a track of another ship;
   said second memory means storing said resultant signals;
   third memory means for storing signals outputted from said correlation means and said signal process means in corresponding memory elements thereof determined by a selected display mode; and
   an indicator for displaying signals read from said third memory means.

46. A radar apparatus for successively radiating search signals in different directions, receiving echo signals and displaying the signals so that surrounding conditions in a wide range of directions are displayed, comprising:
   receiving means for receiving echo signals;
   buffer memory means for storing the received echo signal resulting from one search signal, said echo signals being produced by said receiving means;
   first memory means for storing echo signals coming from a wide range of directions in memory elements thereof corresponding to points on a surface of the Earth at which said echo signals are generated respectively;
   correlation means for performing a correlation process upon signals outputted from said buffer memory and signals read from said first memory means;
   said first memory means storing the processed signals produced by said correlation means;
   second memory means for storing echo signals coming from the wide range of directions in memory elements thereof corresponding to points on a surface of the Earth at which said echo signals are generated respectively;
   signal process means for implementing a signal process on signals produced by said buffer memory means and signals read from said second memory means and for outputting resultant signals representative of a track of another ship;
   said second memory means storing said resultant signals;
   third memory means for storing signals outputted from said correlation means and said signal process means in corresponding memory elements thereof determined by a helm-perspective display mode; and an indicator for displaying signals read from said third memory means.

47. A radar apparatus for successively radiating search signals in different directions, receiving echo signals and displaying the signals so that surrounding conditions in a wide range of directions are displayed, comprising:

receiving means for receiving echo signals;

first memory means for storing echo signals coming from a wide range of directions in memory elements thereof, the memory elements being determined with respect to a bearing;

correlation means for performing a correlation process upon signals outputted from said receiving means and signals read from said first memory means;

said first memory means storing the processed signals produced by said correlation means;

second memory means for storing signals outputted from said correlation means in corresponding memory elements thereof determined by a helm-perspective display mode; and an indicator for displaying signals read from said second memory means.

48. A display system comprising:

signal generating means for generating signals for indication;

a first memory for storing the signals from said signal generating means in memory elements thereof, the memory elements being determined with respect to a bearing;

a second memory for storing the signals outputted from said first memory in corresponding memory elements determined by a helm-perspective display mode; and an indicator for displaying signals read from said second memory.

49. A radar apparatus for successively radiating search signals in different directions, receiving echo signals and displaying the signals so that surrounding conditions in a wide range of directions are displayed, comprising:

receiving means for receiving echo signals;

first memory means for storing echo signals coming from a wide range of directions in memory elements thereof, respectively, determined by a combination of a true motion mode and one of a north-up mode and a course-up mode;

signal process means for implementing a signal process on signals from said receiving means and signals read from said first memory and for outputting resultant signals representative of a track of another ship;

said first memory means storing said resultant signals;

second memory means for storing signals outputted from said signal process means in corresponding memory elements thereof determined by a combination of a relative motion mode and a head-up mode; and an indicator for displaying signals read from said second memory means.

* * * * *

REEXAMINATION CERTIFICATE (3143rd)

United States Patent [19]
Fujikawa et al.

[11] B1 5,351,055
[45] Certificate Issued Feb. 25, 1997

[54] RADAR APPARATUS

[75] Inventors: Takumi Fujikawa, Takarazuka; Motoji Kondo, Kobe, both of Japan

[73] Assignee: Furuno Electric Company, Limited, Nishinomiya, Japan

Reexamination Request:
No. 90/003,958, Sep. 15, 1995

Reexamination Certificate for:
Patent No.: 5,351,055
Issued: Sep. 27, 1994
Appl. No.: 67,165
Filed: May 26, 1993

Related U.S. Application Data

[63] Continuation of Ser. No. 721,547, Jul. 18, 1991, abandoned.

[30] Foreign Application Priority Data

Nov. 21, 1989 [JP] Japan ................................ 1-304188
Nov. 25, 1989 [JP] Japan ................................ 1-305835

[51] Int. Cl.⁶ .................................................. G01S 7/04
[52] U.S. Cl. .......................... 342/184; 342/189; 342/159
[58] Field of Search ........................... 342/184, 176, 342/179, 189, 195, 159

[56] References Cited

U.S. PATENT DOCUMENTS 4,583,191  4/1986  Piesinger .................................. 364/731

*Primary Examiner*—John B. Sotomayor

[57] ABSTRACT

A radar apparatus displays echo signals in a manner that desired echo signals can be easily distinguished from unwanted echo signals such as sea clutter and the like and eliminated, when any one of display modes is selected. The radar apparatus includes a receiving unit for receiving echo signals, a buffer memory for storing echo signals resulting from one search signal and produced by the receiving unit, a first memory for storing echo signals coming from a wide range of directions in memory elements corresponding to points on the surface of the search at which the echo signals are generated respectively, signal process device for applying a signal process on the signals outputted from the buffer memory and the signals read out from the first memory and supplying resultant output signals to the first memory, a second memory for storing the output signals of the correlation means in corresponding memory elements thereof determined in compliance with a display mode selected, and an indicator for displaying the signals read out from the second memory.

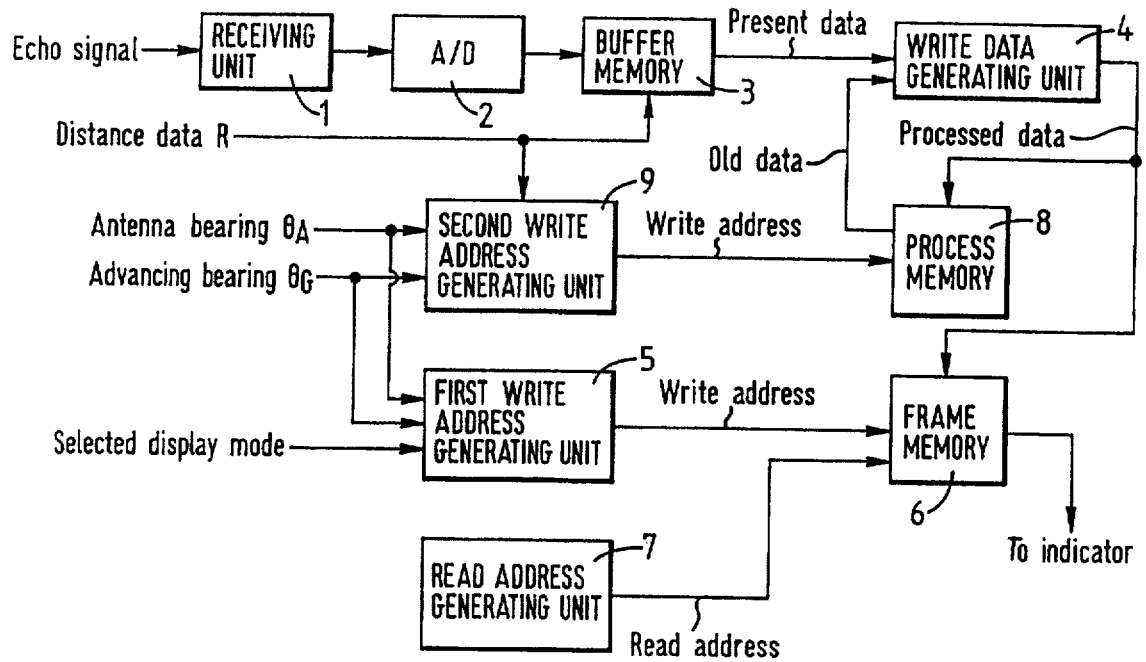

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–29, 35, 37–40 and 43–47 is confirmed.

Claims 30, 36, 48 and 49 are determined to be patentable as amended.

Claims 31–34, 41 and 42, dependent on an amended claim, are determined to be patentable.

30. A method for detecting objects around a ship, comprising the steps of:
   (a) transmitting search signals;
   (b) determining a bearing of the ship;
   (c) detecting a bearing of the search signals;
   (d) setting a helm-perspective display mode;
   (e) receiving echo signals resulting from each search signal radiated in different directions;
   (f) storing echo signals coming from a direction in a first memory, the echo signals being produced by said step (e);
   (g) generating data for picture indication based on output data from the first memory;
   (h) storing data generated in said step (g) in a frame memory;
   (i) generating write addresses for writing data into the frame memory based on data supplied from said step (b), said step (c), and *according to* said step (d);
   (j) providing the frame memory with read addresses;
   (k) displaying data read from the frame memory;
   (l) storing data generated in said step (g) in *memory elements of* a process memory *according to a north-up display mode or a course-up display mode*, the process memory being provided independently on the frame memory; and
   (m) producing write addresses determined with respect to a bearing based on output data of step (b) and said step (c), the write addresses being supplied to the process memory.

36. A method for detecting objects around a ship, comprising the steps of:
   (a) determining a bearing of the ship;
   (b) detecting a bearing of an antenna;
   (c) setting a usage mode obtained by appropriately combining one of a relative motion mode and a true motion mode [and one of a north-up display mode,] *with* a helm-perspective display mode [and a course-up display mode];
   (d) receiving echo signals resulting from each search signal radiated in different directions by the antenna;
   (e) storing echo signals combing from a direction in a buffer memory, the echo signals being produced by step (d);
   (f) generating data for picture indication based on output data from the buffer memory;
   (g) storing data generated in said step (f) in a frame memory;
   (h) generating write addresses for writing data into the frame memory based on data supplied from said step (a), said step (b) and *according to* said step (c);
   (i) providing an address corresponding to a fixed point in the frame memory as a start address for a reading operation;
   (j) displaying the data read from the frame memory;
   (k) storing data generated in said step (f) in *memory elements of a process memory according to a north-up display mode or a course-up display mode*, the process memory being provided independently of the frame memory; and
   (l) producing a continuous series of write addresses in compliance with a true north-up mode to write data which go beyond a boundary of the process memory into a portion in the process memory based on data outputted from both said step (a) and said step (b) and data representative of a distance from a center of a radial radar sweep when one of a true-motion north-up mode and a relative-motion helm-perspective mode is selected.

48. A display system comprising:
   signal generating means for generating signals for indication;
   a first memory for storing the signals from said signal generating means in memory elements thereof, the memory elements being determined with respect to a [bearing] *north-up display mode or a course-up display mode*;
   a second memory for storing the signals outputted from said first memory in corresponding memory elements determined by a helm-perspective display mode; and
   an indicator for displaying signals read from said second memory.

49. A radar apparatus for successively radiating search signals in different directions, receiving echo signals and is displaying the signals so that surrounding conditions in a wide range of directions are displayed, comprising:
   receiving means for receiving echo signals;
   first memory means for storing echo signals coming from a wide range of directions in memory elements thereof, respectively, determined by a combination of a true motion mode and one of a north-up mode and a course-up mode;
   signal process means for implementing a signal process on signals from said receiving means and signals read from said first memory and for outputting resultant signals representative of a track of another ship;
   said first memory means storing said resultant signals;
   second memory means for storing signals outputted from said signal process means in corresponding memory elements thereof determined by a combination of a relative motion mode and a [head-up] *helm-perspective* mode; and
   an indicator for displaying signals read from said second memory means.

* * * * *